United States Patent
McGraw et al.

(10) Patent No.: US 8,843,487 B2
(45) Date of Patent: Sep. 23, 2014

(54) PROCESS AND METHOD FOR DATA ASSURANCE MANAGEMENT BY APPLYING DATA ASSURANCE METRICS

(75) Inventors: Thomas Rickett McGraw, Little Rock, AR (US); Larry Ward Burks, Little Rock, AR (US); Brian Kolo, Leesburg, VA (US)

(73) Assignee: Black Oak Partners, LLC, Little Rock, AR (US)

( * ) Notice: Subject to any disclaimer, the term of this patent is extended or adjusted under 35 U.S.C. 154(b) by 0 days.

(21) Appl. No.: 13/391,457

(22) PCT Filed: Aug. 18, 2010

(86) PCT No.: PCT/US2010/045917
§ 371 (c)(1),
(2), (4) Date: Feb. 21, 2012

(87) PCT Pub. No.: WO2011/022499
PCT Pub. Date: Feb. 24, 2011

(65) Prior Publication Data
US 2012/0158678 A1    Jun. 21, 2012

Related U.S. Application Data

(60) Provisional application No. 61/234,825, filed on Aug. 18, 2009.

(51) Int. Cl.
G06F 17/30    (2006.01)
(52) U.S. Cl.
USPC .......................... 707/736; 707/694; 707/748

(58) Field of Classification Search
USPC ........... 707/687, 999.101, 694, 736, 748, 803
See application file for complete search history.

(56) References Cited

U.S. PATENT DOCUMENTS 6,507,843 B1 *   1/2003   Dong et al. ........................... 1/1
7,487,148 B2     2/2009   James
(Continued)

FOREIGN PATENT DOCUMENTS

WO        WO-01/80054 A1    10/2001

OTHER PUBLICATIONS

International Search Report for related Application No. PCT/US2010/045917, mailed Oct. 25, 2010.

(Continued)

*Primary Examiner* — Cam-Linh Nguyen
(74) *Attorney, Agent, or Firm* — Patton Boggs LLP

(57) ABSTRACT

The present invention relates generally to methods, software and systems for measuring and valuing the quality of information and data, where such measurements and values are made and processed by implementing objectively defined, measurable, comparable and repeatable dimensions using software and complex computers. The embodiments include processes, systems and method for identifying optimal scores of the data dimension. The invention further includes processes, systems and method for data filtering to improve the overall data quality of a data source. Finally, the invention further includes processes, systems and method for data quality assurance of groups of rows of a database.

15 Claims, 9 Drawing Sheets

(56) References Cited

U.S. PATENT DOCUMENTS

| | | |
|---|---|---|
| 8,024,327 B2 * | 9/2011 | Tunkelang et al. ........... 707/722 |
| 8,321,261 B2 * | 11/2012 | Gross ........................... 705/7.32 |
| 8,468,161 B2 * | 6/2013 | Cohen et al. .................. 707/749 |
| 2003/0018549 A1 | 1/2003 | Fei et al. |
| 2004/0249810 A1 * | 12/2004 | Das et al. ............... 707/999.005 |
| 2006/0053136 A1 | 3/2006 | Ashiri |
| 2009/0006382 A1 | 1/2009 | Tunkelang et al. |
| 2012/0116951 A1 | 5/2012 | Chung et al. |
| 2012/0278226 A1 | 11/2012 | Kolo et al. |
| 2012/0278227 A1 | 11/2012 | Kolo et al. |

OTHER PUBLICATIONS

In the U.S. Patent and Trademark Office, Office Action in re: U.S. Appl. No. 13/456,532, dated Jun. 6, 2013, 7 pages.

In the U.S. Patent and Trademark Office, Requirement for Restriction/Election in re: U.S. Appl. No. 13/456,540, dated Mar. 14, 2013, 5 pages.

In the U.S. Patent and Trademark Office, Office Action in re: U.S. Appl. No. 13/456,540, dated May 16, 2013, 10 pages.

* cited by examiner

|     | Name | Address |
|-----|------|---------|
| Row |      |         |
|     |      |         |
|     |      |         |

FIGURE 7

PROCESS AND METHOD FOR DATA ASSURANCE MANAGEMENT BY APPLYING DATA ASSURANCE METRICS

CROSS-REFERENCE TO RELATED APPLICATIONS

This application claims the benefit of U.S. Provisional Application No. 61/234,825, filed Aug. 18, 2009. Priority is claimed to all of the above-mentioned applications, and each application is hereby incorporated by reference.

BACKGROUND

1. Field of the Invention

The present invention relates generally to methods, software and systems for measuring and valuing the quality of information and data, where such measurements and values are made and processed by implementing objectively defined, measurable, comparable and repeatable dimensions using software and complex computers.

2. Description of Related Art

Commercial companies and government agencies purchase, generate, collect and acquire large amounts of data and information, both externally and internally, to run their businesses or governmental functions. This data is used to manufacture an information product, designed to improve the outcome of a process such as the decision to grant credit, issue an insurance policy or the course of treatment for a patient. The data and information relating to individuals upon which multi—million dollar business decisions rely, have no data quality dimensions or metrics.

Today companies and government agencies invest significant amounts in data and information acquisition, generation, collection, aggregation, storage and use. The companies and government agencies make decisions, incur expenses, generate revenue, make policy, engage in activities and regulation all based on their data and information.

Business managers, decision makers and business intelligence modelers rely on automated systems to strain and sieve through oceans of data to find just the right combination of data elements from multiple sources to make decisions. The data elements they extract and use may be wrong or incomplete, or worse yet, the information may be correct but not timely or not have enough coverage from which to glean valuable decisions. Companies which use large amounts of data in their business processes do not presently know the absolute and relative value of their data assets or the economic life of such assets, as measured and scored by the implementation of data metrics. These same companies do not presently know how to best use their data assets.

Further, the present state of industry for information and data quality is processing the information for entity resolution, i.e. identifying one individual by various names, cleansing, deduplication, integration and standardization and information elements. While these functions are appropriate, they do not include any form of data assurance management.

Surveys have revealed that data quality is considered important to business, and data should be treated as a strategic asset. These same companies, however, rarely have a data optimizing or data governance strategy. Further, there are no systems for predicting and systematically verifying data assurance in the marketplace. Instead, data quality software tool vendors typically focus on name de-duplication and standardization of addresses with USPS standards. Thus, currently every piece of this data or information is treated with equal weight and value, with no distinction among the data and its quality for such metrics as to its accuracy, relevance, timeliness, completeness, coverage or provenance.

There exists a need for automated systems and methods for measuring and scoring dimension of data with a result of metrics. There also exists a need to understand and evaluate the true value of data in relation to business applications, to maximize potential and create and measure data value. These data assurance needs include: (i) the relative, compared contribution of data sources; (2) the absolute contribution of data sources to the data product being created; (3) the score or standardized measure of value of a data source in its application, data class or data use; (4) the optimization of data sources in the optimal order of functional use such as the cascading of data sources in a priority of use order to obtain the best or optimal sequential use of the group of data sources; and (5) the determination of the intangible asset value of the data investment of a company.

SUMMARY

The problems presented are solved by the systems and methods of the illustrative embodiments described herein.

One purpose of this invention is to invoke data assurance management and metrics on data to provide better data or mixture of data for a particular business or governmental application such as income validation, asset validation, wealth indicators, model validation, refinance, credit line increase or decrease, managing risk, mortgage portfolio runoff, debtor early warning systems, more timely view of debtors than provided by credit bureaus, government assisted transactions, intelligence community decisioning, and anti-money laundering.

The invention is a process and method for management of data assets by computing data quality metrics on data sources to identify quality issues and measure the overall health of data based assets. Based on the values of these metrics, data may be transformed to improve the value of one or more metrics. One embodiment of the invention is for methods, systems and processes of data assurance management. Such methods, systems and processes comprises the steps of selecting a plurality of data elements as source inputs, conducting a statistical random sampling of the plurality of data elements, scoring the statistical random sampling, wherein said scoring yields data metrics, determining the frontier data points, utilizing the frontier data points to select an optimal data aggregation and integrating the optimal data aggregation into an output database. The data assurance management method can further include data metrics selected from the group consisting of: Accuracy, Redundancy/Uniqueness, Velocity, Acceleration, Completeness, Measure, Timeliness, Coverage, Consistency, Availability, Read Time, Write Time, Propagation Time and Precision. The data assurance management can further include multivariate optimization. Further, the data assurance management can include integrating the optimal data aggregation into an output database further comprises determining if the data is entered into an integrated database, wherein the data is only entered if the data is unique or a rules engine selects the data as an optimal data set.

Other embodiments include data assurance management methods, systems and processes for data filtering, which includes selecting a plurality of data elements as source inputs a data base, retrieving the data elements, utilizing rules in a data hygiene engine to determine if the data is valid, wherein the data hygiene engine contains one or more of the following types of rules: field rules, row rules and groups of rows rules; wherein if the data is valid, the data is saved in a production database.

This application further includes numerous embodiments and variants all applicable to data assurance management methods, systems and processes.

Other objects, features, and advantages of the illustrative embodiments will become apparent with reference to the drawings and detailed description that follow.

BRIEF DESCRIPTION OF THE DRAWINGS

Figure 7:
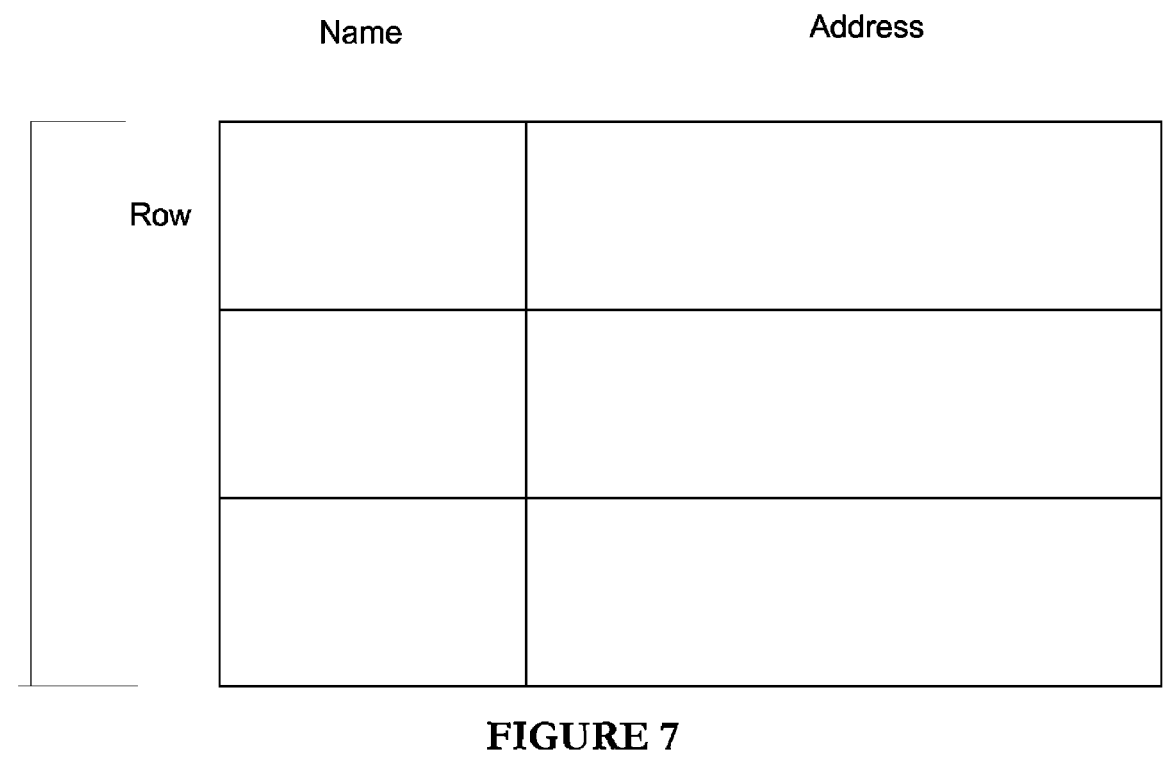

FIG. 7 is a spreadsheet illustrating the difference between a row and a group and showing a group is more than one row.

DETAILED DESCRIPTION OF ILLUSTRATIVE EMBODIMENTS

Figure 1:
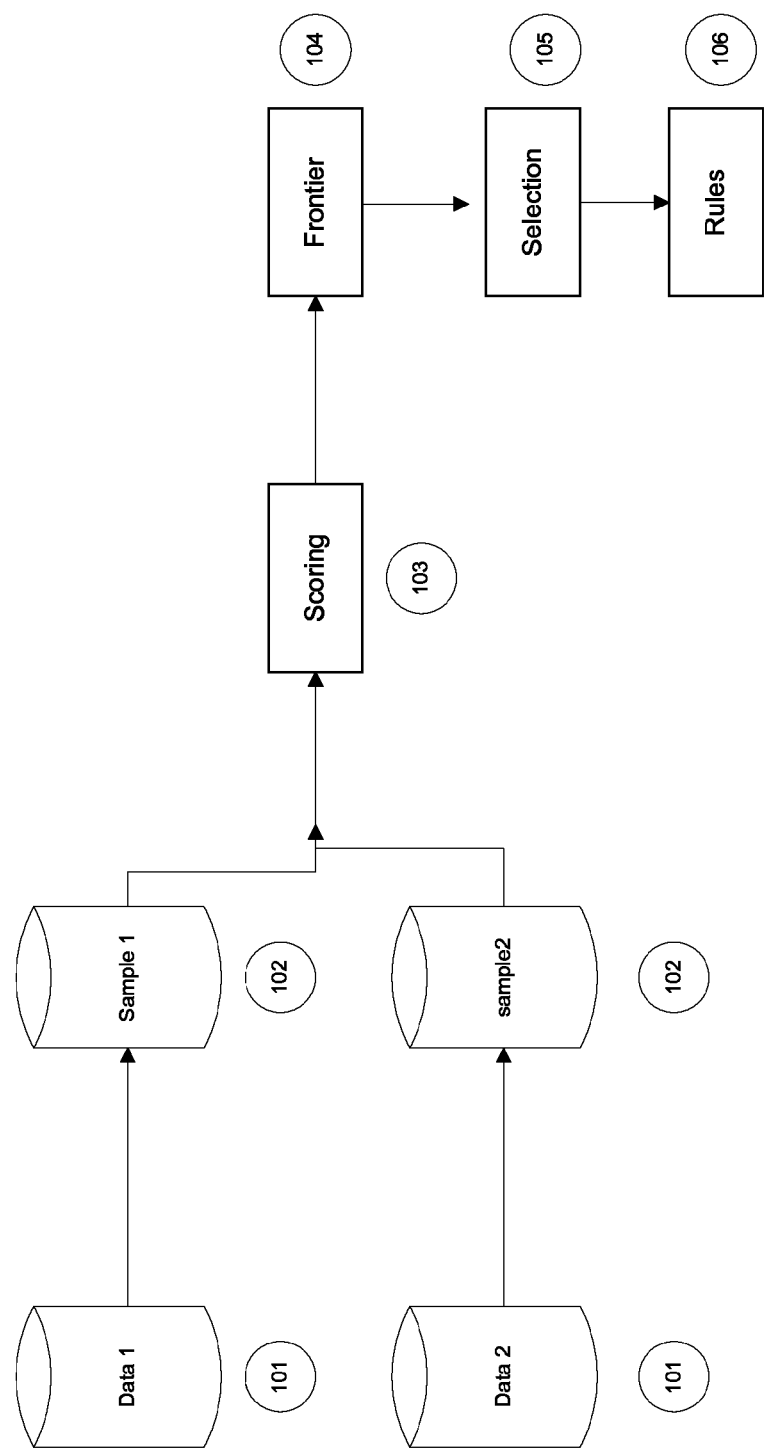
FIG. 1. is a flowchart describing a process or method for identifying optimal scores of the data dimension.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

The invention generally is to methods and systems for data assurance management. These methods and systems may be implemented in whole or in part by a computer while executing instructions from a data access module. A data access module includes executable instructions to modify a data source query (e.g., a Structured Query Language (SQL) query, a MultiDimensional eXpressions (MDX) query, a Data Mining Extensions (DMX) query and the like) to include specified filters. The data access module also includes executable instructions to apply the generated data source query to an underlying data source, which may form a portion of a computer or may be accessed as a separate networked machine through the network interface circuit.

As will be appreciated by one of skill in the art, aspects of the present invention may be embodied as a method, data processing system, computer program product, or embedded system. Accordingly, aspects of the present invention may take the form of an entirely hardware embodiment or an embodiment combining software and hardware aspects. Furthermore, elements of the present invention may take the form of a computer program product on a computer-usable storage medium having computer-usable program code embodied in the medium. Any suitable computer readable medium may be utilized, including hard disks, CD-ROMs, optical storage devices, flash RAM, transmission media such as those supporting the Internet or an intranet, or magnetic storage devices.

Computer program code for carrying out operations of the present invention may be written in an object oriented programming language such as Java, Smalltalk, C++, C#, Visual Basic, .NET enabled language, or in conventional procedural programming languages, such as the "C" programming language. The program code may execute entirely on the user's computer, partly on the user's computer, as a stand-alone software package, partly on the user's computer and partly on a remote computer, or entirely on the remote computer.

The computer may also include a dataset database, which is a source of data that one of skill in the art desires to analyze for data assurance. The dataset database may form a portion of a computer or may be accessed as a separate networked machine through a network interface circuit.

It should be appreciated that any network described herein may include any system for exchanging data or performing steps of the invention, such as Internet, intranet, extranet, WAN, LAN, satellite communication, cellular phone communications, and the like. Further, the communications between entities concerning the transaction or access request can occur by any mechanism, including but not limited to, Internet, intranet, extranet, WAN, LAN, point of interaction device (point of sale device, personal digital assistant, cellular phone, kiosk, etc.), online communication, off line communication, and wireless connection. The present invention might further employ any number of conventional techniques for data transmission, signaling, data processing, network control, and the like. For example, radio frequency and other wireless techniques can be used in place of any network technique described herein.

The computer may have multiple input devices, output devices or combinations thereof. Each input/output device may permit the user to operate and interface with computer system and control access, operation and control of the data assurance management system. The computer may also include the various well known components, such as one or more types of memory, graphical interface devices such as a monitor, handheld personal device, and the like. The graphical interface devices may not only present information from a computer physically connected therewith, but also web pages that may form part of the data assurance management system.

The computer system may communicate with a web server, application server, database server or the like, and may access other servers, such as other computer systems similar to the computer via a network. The servers may communicate with one another by any communication means to exchange data or perform steps of the invention.

Aspects of the present invention are described with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, server, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer, server or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks, and may operate alone or in conjunction with additional hardware apparatus described herein.

Various embodiments of the present invention will now be described with reference to the figures in which like numbers correspond to like references throughout.

The invention has several applications. For instance, the invention can be used to acquire customers, including processes and systems for use in marketing, originations, mergers or acquisitions. The invention can also be used for portfolio management, for tasks such as customer management, collections and recovery, mortgage refinance, mortgage portfolio segmentation, early warning systems and enterprise risk management. Further, the invention can be used for financial protection, including the areas of fraud, regulatory compliance, privacy compliance and anti money laundering.

The results and benefits of employing the invention for determining data quality are numerous. For instance, unneeded data sources can be deleted, or if more data is needed new sources can acquire it. Further, it can lead to negotiating more favorable data contracts and improve several parameters of information quality. Parameters of information may include one or more of the following: data accuracy, timeliness, completeness and relevancy. Another benefit to determining data quality is the ability to create and implement business risk mitigation programs. The invention can result in a report to help assure that the use of the data is in compliance with the laws and regulations of the United States, various States and foreign countries. The invention can be used to create an asset value for data and treat the data much like an investment portfolio with all types of dynamic principles or factors applied such as patterns, inertia, comparables, ratios, percentages, yields, risks, safety, tax considerations, liquidity, returns, derivatives, marketability, pricing, access and content. In sum, assuring and managing data quality by utilizing the invention can lead to an increase in return on investment ("ROI").

Further, the data assurance management processes and methods disclosed herein are not limited to any industry or government function or agency, and may be used, for example, in the industries of Financial Services, Telecommunications, Publishing, Healthcare, and Retail and in the Federal Government functions and agencies for the intelligence community, Department of Justice, US Army, US Navy, Department of Homeland Security, Social Security, Medicare, and Environmental Protection Agency.

The results of the data assurance method are numerous, and may include one or more of the following:
1. Maximize the return on investment of each marketing campaign (right person, right message, timely, relevant, accurate, profitable)
2. Reduce bad debt
3. Improve collection of debt
4. Reduce the days outstanding (DSO)
5. Optimize payments terms & options
6. Improve effectiveness and efficiency of distribution channels
7. Improved customer profiles
8. Improved customer segmentation
9. Improved prospect profile
10. Improve prospect segmentation
11. Identify "best customer" attributes
12. Calculate the density of variables & elements
13. Perform needs and haves assessment
14. Consolidation of marketing databases and appending financial records
15. Assessment of duplicates in customer/internal databases (multi product purchasers, multi inquirers (Tire kickers), conversion rates)
16. Data classification system for privacy & compliance
17. Data compilation methods
18. Source updates
19. File updates
20. Calculate degradation of file
21. Appending/overwriting
22. Append internal financial records to marketing databases to understand where cash and profits are derived
23. Contact preference website to insure accurate data and improve customer care
24. Contact inactive persons or customers with communication preferences and to understand their interests
25. Append new data to records that have a high propensity to respond
26. From volume based marketing to Value based direct marketing
27. Enriched content improves acquisition, performance, and cost effectiveness
28. Create standard ratings system
29. Present value calculations
30. Yield to maturity
31. Current yield
32. Data risk based on economic conditions
33. Calculation of speed
34. Price sensitivity (sensitivity increases at decreasing rate as maturity approaches)
35. Effective maturity
36. Duration
37. Score the attributes and value of a data source compared to other data sources for a particular information quality dimension-metric
38. Score the attributes and value of a group of data sources compared to other groups of data sources for a series of information quality dimensions-metrics
39. Determination and calculation of value of data assets
40. Determination and calculation of amortization of value of data assets
41. Optimize external data purchases
42. Optimize internal data accumulation and creation
43. Optimize data maintenance costs
44. Evaluate impact of loss or interruption of data sources
45. Determine alternative data sources in the event of loss or interruption of data sources 46. Comparison of data sources, internal and external, upon acquisition or merger of Companies
47. Reduction of data costs
48. Increase value of data assets
49. Create volatility metrics for data assets
50. Synchronize contract due dates (enterprise)
51. Perform Cost/Benefit analysis
52. Create & apply return on data assets calculation
53. Create unique customer insights
54. Enrich customer data with internal financial performance data
55. Suppress external data based on internal financial performance data.
56. Incubate efficient e-business
57. Deploy best-of-breed interfaces
58. Enhance efficient e-services
59. Transform integrated, confusing data sources to usefulness and
60. Iterate the synergies of multiple Information Quality Dimensions.

Information quality metrics are computable values applied to information data structures. Generally, the metrics represent objective, computable, and comparable values used to assess the quality of the underlying information. Computable values are represented as mathematical formulae that may be applied generally to information data. These formulae assume that information is represented as a data sequence (i.e. relational database, sequence of objects, etc.).

Metrics envisioned by the inventors should be objective, measurable, comparable, and repeatable. Metrics having these qualities are good candidates for information quality metrics as these properties allow for values to be reliably compared at different times. The ability to compare metric values over time provides the ability to measure improvement and to correlate improvement to other business metrics. This invention concerns metrics that have a general applicability. General metrics may be computed for a large number of disparate systems. These metrics may be employed to compare information systems with different data, different purposes, and with different architectures. The metrics module includes executable instructions for various processes, discussed below.

To assist in understanding the invention, the following definitions are provided.

DEFINITIONS

Objective—Metrics should be objective not subjective. Subjective metrics are prone to inconsistent interpretation or manipulation by the measurer making them less reliable. For example, a questionnaire asking for an opinion (i.e. "Do you like our Information Quality on a 1-5 scale with 1 lowest and 5 highest?") can yield different results depending on how the question is worded. The resulting metric is not objective and may lead to inconsistent results. Similar questions may lead to different results undermining the utility of the measurement. This should not be understood to mean that all questionnaires lead to subjective metrics. A question is objective so long as it is reasonably expected that the majority of responses interpret the question in the same way.

Measurable—Metrics should employ definitive units of measure to provide a quantifiable value that is available for analysis. Non-measurable metrics may have a theoretical or conceptual value, but have little utility. Immeasurable metrics may be converted to measurable metrics. For example, an immeasurable quantity may be transformed to a measurable quantity when an adequate definition is provided. Second, some immeasurable quantities may provide business value, but they should not considered metrics. Metrics, by definition, must be measurable.

Comparable—The value of a metric should be comparable to other values. Comparable means the units of measure are the same or convertible to one another such that the sum of more than one metric provides a meaningful result. For example, the cost of two metrics is comparable because one can compare the cost values and determine that one is higher than the other. Similarly, quantity is comparable because one can compare two different quantities and determine one is greater than the other. However, a metric for cost and a metric for quantity may not be comparable. The metrics have different units of measure (cost in dollars, quantity in bytes) and their sum does not provide a meaningful result. Two such measurements may not be comparable in a meaningful way.

Repeatable—Repeating the same measurement under similar conditions to provide similar results. If a measurement is not repeatable, its value is unreliable. A measurement may be repeatable, however, even if its precise original measurement cannot be duplicated. For example, a database may be under constant updates, with data added and deleted quickly. The count of the number of rows at one instant is a repeatable measurement even though its measurement cannot be duplicated. Instead, the measurement is repeatable because if we measured again under similar conditions we would get similar results.

Set—A data set is a collection M into a whole of definite, distinct objects m. Any collection of distinct items may be a set; however, the members of the collection must be distinct.

Sequence—A sequence is an ordered list of objects. The members of a sequence are not necessarily distinct. Data is often formulated as a sequence, with a first element, second, third, etc. Data that is not ordered may be made into a sequence by assigning a unique integer to each data element. In this way an unordered bag of data can be made into an ordered data sequence.

Cardinality $|S|$—The number of elements in a sequence. Let S be a data sequence. The cardinality (number of elements in the sequence) is represented as $|S|$. Generally, the cardinality of a sequence may be finite, infinite, or transfinite. However, data sequences encountered in actual applications are always finite (it would require an infinite amount of storage space to hold an infinite data sequence).

Parallel Sequences $\|$—Let S and T be data sequences. The sequences S and T are called parallel if and only if $|S|=|T|$, and this is represented as $(S\|T)$. Parallel sequences are common in relational databases. For example, a data table with two fields: First Name, Last Name would have each column of data as a valid data sequence. Each of these sequences has the same number of rows, making these parallel sequences. More importantly, each row of data is often taken together as a unit. Parallel sequences aide in formalizing this concept and identifying sequence elements that belong together in the same unit.

Unique Sequence—A unique sequence is a sequence where every term is different from all other terms. The elements of a unique sequence form a set, and the number of elements in the set is the same as the number of elements in the sequence.

Oracle—An all knowing machine that is able to determine the true value of some quantity, and can be used to define metrics that would be otherwise immeasurable. For purposes here, an oracle is a highly trusted source of information.

Data Elements—A basic unit of information having a unique meaning and distinct values. The characteristics of a data element are: 1) a name of the element, 2) clear definition and 3) an enumerated value. Examples of data elements include, but is not limited to, a person or entity name, address, phone number; a person's income, sex, marital status; proprietary medicinal product name; active ingredient; pharmaceutical dose form; strength of the active ingredient; route of administration; or units such as parts per million (PPM) or parts per billion (PPB).

Metrics module—The metrics module is a module of executable instructions received from one of skill in the art to determine which metrics will be applied to data, how the data will be organized, if at all, and the presentation of the metrics results. The metrics module includes executable instructions for the calculating the metrics.

Metrics—A measure of a data quality dimension, where a data quality dimension is a characteristic of data. Metrics envisioned by the inventors should be objective, measurable, comparable, and repeatable. Metrics having these qualities are good candidates for information quality metrics as these properties allow for values to be reliably compared at different times. Application of metrics yields a value (score) for each data analyzed. The score may be numerical, such as a positive or negative number, or a symbol. More importantly, the score must be such that the score of each data in a plurality of samples may be compared to one another. The terms "metrics," "data quality metrics" and "dimensions" may be used interchangeably.

Below are several examples of dimensions and how they are scored to yield metrics.

I) Accuracy.

Accuracy measures how close the test data sequence S is to the 'truth' set. The truth set must be obtained from external means and cannot be derived from S. Accuracy is used to quantify the correctness of the information at hand. In any large information system there are bound to be incorrect data elements. Incorrect data may arise from many sources including imperfect data entry or collection, transmission errors in electronic systems, data that has changed but not been updated, or any number of other causes of inaccurate data values. Data that is incorrect often has limited use. A list of customer names and addresses has little value if the data is inaccurate. Measuring the accuracy of the data is useful in evaluating how valuable the data in the information system is. To determine accuracy, let $\tau: S \rightarrow \{0,1\}$ be an oracle such that $\tau$ maps the elements of the sequence $s_i \in S$ to the value 1 if and only if the value of $s_i$ is correct and 0 otherwise. The set S is often produced through some measurement or data entry process. These processes are prone to errors. The truth function $\tau$ indicates whether a given sequence element is correct.

The accuracy A metric is defined as $$A = \frac{1}{\max(|S|, \tau(S))} \sum_{s_i \in S} \tau(s_t)$$

II) Redundancy/Uniqueness.

Redundancy and Uniqueness are related metrics. Redundancy measures the amount of duplicate data in an information system, while Uniqueness measures the amount of distinct information. Redundant data is often encountered in large information systems, as well as when combining disparate information systems. Understanding the data Uniqueness within an information system allows one to compute how much useful data is present. For example, a list of 10,000 customer names and addresses is not very useful if all of the records are identical. In addition, Redundancy is very useful when combining information systems. For example, when businesses are combined during a merger or acquisition, there is often a need to combine information systems. In many cases, the value of the merger is in part based on the value of combining their information systems. In these cases it is useful to know how much data is redundant between these systems in order to quantify the value of the merger of the systems. The redundancy and uniqueness metric is calculated as follows: let S be a data sequence and let $\overline{S}$ be a set whose elements are the elements of S.

Redundancy and Uniqueness are $$R = 1 - \frac{|\overline{S}|}{|S|}$$

$$U = \frac{|\overline{S}|}{|S|}$$

where both Redundancy and Uniqueness are on the range [0,1].

III) Velocity—

Velocity measures the rate of change of data over time. This is important because data is often dynamic and changes over time. Understanding the Velocity of the data assists in estimating how accurate the data is at any given time. For example, if a list of customer names and addresses was developed two years ago, and 1% of people move every year, then 1-2% of the data is no longer accurate. Alternatively, once velocity is measured, collection methods can be designed to minimize the impact of inaccurate data. For example, if one tolerates 5% inaccurate data and the data changes 1% per month, then data needs to be recollected every five months in order to satisfy the tolerance bounds. Collecting more frequently may result in unnecessary costs. The velocity metric is calculated as follows: let S(t) be a data sequence at time t. Let $v: S \times T \rightarrow \{0,1\}$ be a map such that $v=1$ if $s_i \neq t_i$ and 0 otherwise.

$$v = \frac{1}{\Delta t} \sum_{i=1}^{\max(|S(t), S(t+\Delta t)|)} v(s_i(t), s_i(t+\Delta t))$$

where Velocity is measured on the range $(-\infty, \infty)$ and counts the number of fields changed per unit time.

IV) Acceleration—

Acceleration is the rate of change of velocity over time. If the information velocity is changing over time, the data may become inaccurate more or less quickly than indicated by the velocity. Measuring the acceleration helps determine how rapidly the velocity is changing, and provides confidence in the utilization of velocity. When acceleration is near zero, the velocity is near constant. When the acceleration is not near zero, the velocity is changing and measuring velocity is insufficient. In these circumstances, accounting for the acceleration will provide better estimated on the length of time required between data collections. The acceleration metric is calculated as follows: let v(t) be the velocity measured at time t.

$$a = \frac{v(t+\Delta t) - v(t)}{\Delta t},$$

and Acceleration is measured on the range $(-\infty, \infty)$.

V) Completeness—

Completeness may be used to measure how many rows of data in a database have all required fields present. Theoretically, if a field is required it must be present in each row. On the other hand, a database may have fields that are not required in the data table and are thus not present in every row. Once the completeness of a database is calculated, it can be compared with the completeness of other databases. The completeness metric is measured by asking how many of the elements of the test data sequence S are present versus how many are left null (blank/no entry). In other words, let $\rho$: $S \rightarrow (0,1)$ be a map such that P takes the value 1 if and only if $s_i \in S$ is not null and 0 otherwise. Completeness is defined on the range [0,1]. The completeness $C_p$ for a set of parallel sequences $S_1, S_2, \ldots, S_n$ is defined as $$C_p = \frac{1}{n|S|} \sum_{s_i \in S_1, S_2, \ldots, S_n} \rho(s_i)$$

VI) Amount of Data—

Measures the relative amount of data present. This measurement allows one to evaluate how much data is present relative to how much is needed. This aspect of information quality helps determine if the information system is capable of supporting the present or future business needs. Some situations require a certain amount of data present. For example, in a marketing campaign, if 5% of people respond to a campaign and become customers and one desires to get 1,000 new customers, then the campaign must target at least 20,000 people. The amount metric is defined as: let p be the number of data units provided and n be the number of data units needed. The amount of data D metric is $$D = \frac{p}{d},$$

where the amount of Data is on the range [0, ∞). When D<1 there is always less data than needed. However, when D>1 there are more data units than needed, but this does not necessarily mean all data needed is present because the data may be redundant, or the uniqueness may be too low.

VII) Timeliness—

Timeliness examines the utility of data based on the age of the data. Data is often a measurement over some period of time and is valid for some period after. Over time, the utility of the data decreases as the true values will change while the measured data does not. For example, if it takes two day to receive data, and the data is only valid for one second after it is received, the timeliness is low. However, if the data were valid for 200 days after delivery, the timeliness would be much higher. To determine the timeliness metric, let f be the expectation of the amount of time required to fulfill a data request v be the length of time the data is valid after delivery. The timeliness T is given by $$T = \frac{f}{v}.$$

Timeliness is measured on the range (−∞,∞)). Negative values indicate that the data is invalid when received.

VII) Coverage—

Coverage measures the amount of data present in relation to all data. Data is often a measurement of some type. For example, if given a list of names and addresses of people in the United States, the coverage would be the ratio between all of the accurate data present to the total number of U.S. households. Often an oracle is used to provide this information since it may not be known how much data is actually present, i.e., it's unknown exactly how many U.S. households are in existence at any given time. To find the coverage metric, let $\pi$: $S \rightarrow N$ be an oracle that provides the length of the complete data sequence. Let $\tau$: $S \rightarrow \{0,1\}$ be an oracle such that $\tau$ maps the elements of the sequence $s_i \in S$ to the value 1 if and only if the value of $s_i$ is correct and 0 otherwise. The coverage $C_v$ is $$C_v = \frac{1}{\pi(S)} \sum_{s_i \in S} \tau(s_i).$$

The coverage measures the amount of correct data in S in relation to the total amount of data in the true data sequence. Coverage is on the range [0,1].

VIII) Consistency—

Consistency measures the number rule failures in a data sequence as a proportion of all rule evaluations. Rules are often applied to data sequences. Some rules can be applies strictly to individual sequence elements (R: $s_i<4 \forall s_i \in S$) or may be defined across multiple sequences (R: $s_i+t_i=1 \forall s_i \in S$, $t_i \in T$, S|T). Consistency allows one to measure the application of business rules to an information system. Once the business rule is defined, data in the information system is examined to determine how often the rule is satisfied. For example, if the business rule is that all customers must provide a valid telephone number when placing an order, the phone numbers for the existing orders can be examined to determine how often an order is associated with a valid telephone number. The consistency metric is determined as follows: given a rule R, all applications of R is computed to determine whether the rule is satisfied (consistent) or is violated (inconsistent). Let R be a sequence of applications of R. Let X: $R \rightarrow \{0,1\}$ be a map such that X takes the value 1 if the application $r_i \in R$ is consistent and 0 otherwise. The consistency $C_s$ is given by $$C_S = \frac{1}{|R|} \sum_{r_i \in R} X(r_i).$$

IX) Availability—

Availability measures how often a data sequence is available for use. Databases may be unavailable at times for maintenance, failure, security breaches, etc. Availability measures the proportion of time a data sequence is available. Measuring the availability of the information source over a period of time provides insight to the overall data quality that can be expected. To calculate the availability metric, let S be a data sequence. During some finite time t, let A be the amount of time S was available and U be the amount of time S was not available so that A+U=t. The availability is $$A_v = \frac{A}{A+U} = \frac{A}{t},$$

where the availability is measured on the range [0,1].

X) Read Time—

The Read Time measures how quickly data may be accessed available upon request. When a user requests to access a data sequence, there is a finite time required to gather the information and provide it to the user. For a typical database system, this is simply the time required to access stored information. Other data sources, such as questionnaires, may require elaborate means to access current data. The Read Time is a measure that can be used to estimate the expected time required to get information from a source. The read time metric is the expectation of the time required to fulfill a data request from S, where the read time is measured on the range [0, ∞). The read time does not include the time required to analyze the data and gather it into a useful form.

XI) Write Time—

The write time measures how quickly an update to a data sequence is available for use, i.e., the time required to store information in an information system. When a user requests to update a data sequence, there is a finite time required to change the data and make the change available to others. The Write Time measures this delay. The write times includes any time required to process or analyze the information to put it into a useful form. Thus, the write time metric is the expectation of the time required to update a data sequence, where the write time is measured on the range [0, ∞).

XII) Propagation Time—

The propagation time measures how quickly an update to a data sequence may be used by combining the read time with the write time. The propagation time is useful in understanding the overall processing time to gather, analyze, and access new information. To find the propagation time metric, let w be the write time for a data sequence S and let r be the read time on S. The propagation time is $T_P=w+r$, where the propagation time is measured on the range [0, ∞).

XIII) Relevancy—

Relevancy is a measure of the dispersion of data about a central point in relation to the true value of the data. The predicted value, as presented in the data, is compared to the true value. A tolerance is set, measured either as a percent range against the true value or predicted value, or as an absolute range against the true value or predicted value. When the true value (predicted value) falls within the tolerance, the predicted value is determined to be relevant. When the true value (predicted value) falls outside the tolerance, the predicted value is determined to be not relevant. The relevancy metric is the frequent count of the number of predicted values that are relevant to the total number of predicted values. Items are only counted when a true-predicted value pair is present.

Other metrics and dimensions may include those set out in Binary Classifier Book: Binary and Multiclass Classifiers ISBN: 1615800131 © 2010 by Brian Kolo, the entirety of which is incorporated by reference.

Embodiments of the Invention

FIG. 1 is an example of a method for data assurance management in accordance with an embodiment of the present invention. Different functions, operations or evens of the method of FIG. 1 may be performed by or involve different entities, individuals, systems of the like. This embodiment occurs in whole or in part by one or more computers.

FIG. 1 describes a method for identifying optimal data combinations and discovering optimal integration rules. In a first step 101, a plurality of sources of data elements is selected as source inputs to the method. The data may all reside in a single database, however, it is understood that certain elements of the data arise from a particular source, and there exist multiple sources for the data. The exact data elements selected depends upon the data owner or licensee needs or requirements. The data element can be any form, such as, for example, raw un-integrated data. The data can also be the result of other data integration. The data sources are selected because it is desired to integrate the data elements of the plurality of data sources with one another. The selection of the exact data sources (Data 1 and Data 2) may occur by any means, including by person or computer.

In one alternative embodiment, the uses or needs of internal and external data is classified separately into categories of marketing, risk, financial and operations. The invention also includes combining categories or functions identified by the International Society of Automation (ISA) for the purpose of identifying other uses and needs for the data. The determination of the uses and needs of the data may also influenced by laws and regulations of the United States, constituent States and foreign countries.

A statistical random sampling of the data elements is taken from the plurality of data sources in step 102, resulting in a plurality of samples (Sample 1 from Data 1, Sample 2 from Data 2, etc.). The statistical sample can be taken by any means or method, and is application dependent. The sample is a portion of the population selected to represent an entire population, or a subpopulation of interest. A simple random sample is a sample of size n from a population of size N selected such that each possible sample of size n has the same probability of being selected. The population is the collection of all records of interest. Random sampling methods are generally known, and include associating a random number with the records of the table, so that a particular number of the records are selected randomly. Ideally, the statistical sample would be data elements which correspond to data elements from the other data sources. For example, the data elements selected from the plurality of data sources would all be a person or entity name, address, phone number; a person's income, sex, marital status; proprietary medicinal product name; active ingredient; pharmaceutical dose form; strength of the active ingredient; route of administration; units of measure, and the like. The data element does not have to be identical. For example, one data source may have the data element of a name such as Jane Smith and another data source may have the same name, Jane Smith, or a variant such as J Smith. In one alternative embodiment of this invention, the process does not include a step 102.

The plurality of samples from the statistical random sampling of step 102 is then scored in Step 103. Scoring involves taking the Step 102 plurality of samples (Sample 1 and Sample 2), and calculating the data quality s. Metrics can be scored by any means contemplated by this specification, including Accuracy, Redundancy/Uniqueness, Velocity, Acceleration, Completeness, Measure, Timeliness, Coverage, Consistency, Availability, Read Time, Write Time, Propagation Time and the like.

The metrics applied depend upon the uses, needs data, objectives for the data, and data priority. It is envisioned that in one embodiment, one of skill in the art pre-determines which metrics modules will be applied, and instructs the metrics module accordingly. The metrics module is a module of executable instructions received from one of skill in the art to determine which metrics module process will be applied to the plurality of samples, how the plurality of samples will be organized, if at all, and the presentation of the results. The metrics module includes executable instructions for the metrics. The metrics module efficiently filters the plurality of samples from the database and organizes the plurality of samples based upon the executable instructions.

The plurality of samples of step 102 is retrieved upon instructions from the metrics module, and optionally stored in a temporary spreadsheet or database. The metrics module may optionally then reorder the plurality of samples in an ascending order of number of distinct attributes, or based upon information lacking or present in the dataset. In another embodiment, the plurality of samples is ordered by descending merit. In one embodiment, if multiple categories have the same number of distinct attributes, they are grouped in their original order. The categories need not be physically reordered. Alternatively, it is determined whether it is more efficient to physically reorder the categories or number them so they appear to be reordered in interactions with the data access module. This is an optional operation; no operation in the process is dependent on this operation.

Once this restructuring is complete, the metrics module applies a first metrics to the plurality of samples, and applies a value (score) to each data in the plurality of samples. The score may be numerical, such as a positive or negative number, or a symbol. More importantly, the score must be such that the score of each data in the plurality of samples may be compared to one another. Thus, the plurality of samples must have the same units. The score for each data is associated with the data in a spreadsheet or database. The metrics module then applies a second metric to the plurality of samples, and applies a second value (score) to each data in the plurality of samples. The second value (score) is associated with the data in the spreadsheet or database. This process is repeated for each metrics process selected by the metrics module.

In Step 104, once the scores for the plurality of samples are calculated, the resulting data sets must be combined and multivariate optimization is performed. The data can be combined in every possible way, as each combination/data set will yield different results. Each sequential combination yield a unique data set different from other sequential combinations, also termed a permeation. For instance, combining Data 1 and Data 2 will yield four sets of data: Data 1 by itself, Data 2 by itself, Data 1+Data 2 and Data 2+Data 1. Combining three data sets (Data 1, Data, 2 and Data 3) would yield: Data 1, Data 2, Data 3, Data 1+Data 2+Data 3, Data 1+Data 3+Data 2, Data 2+Data 3+Data 1, etc., until all data sets are combined such that $$\sum_{k=1}^{N} \frac{N!}{(N-k)!}.$$

For each combined data set, the metrics are then plotted against each other. Thus, two metrics yields a two dimensional plot, three metrics yields a three dimensional plot, etc. The upper bound is limited only the number of distinct metrics and computational power.

Figure 2:
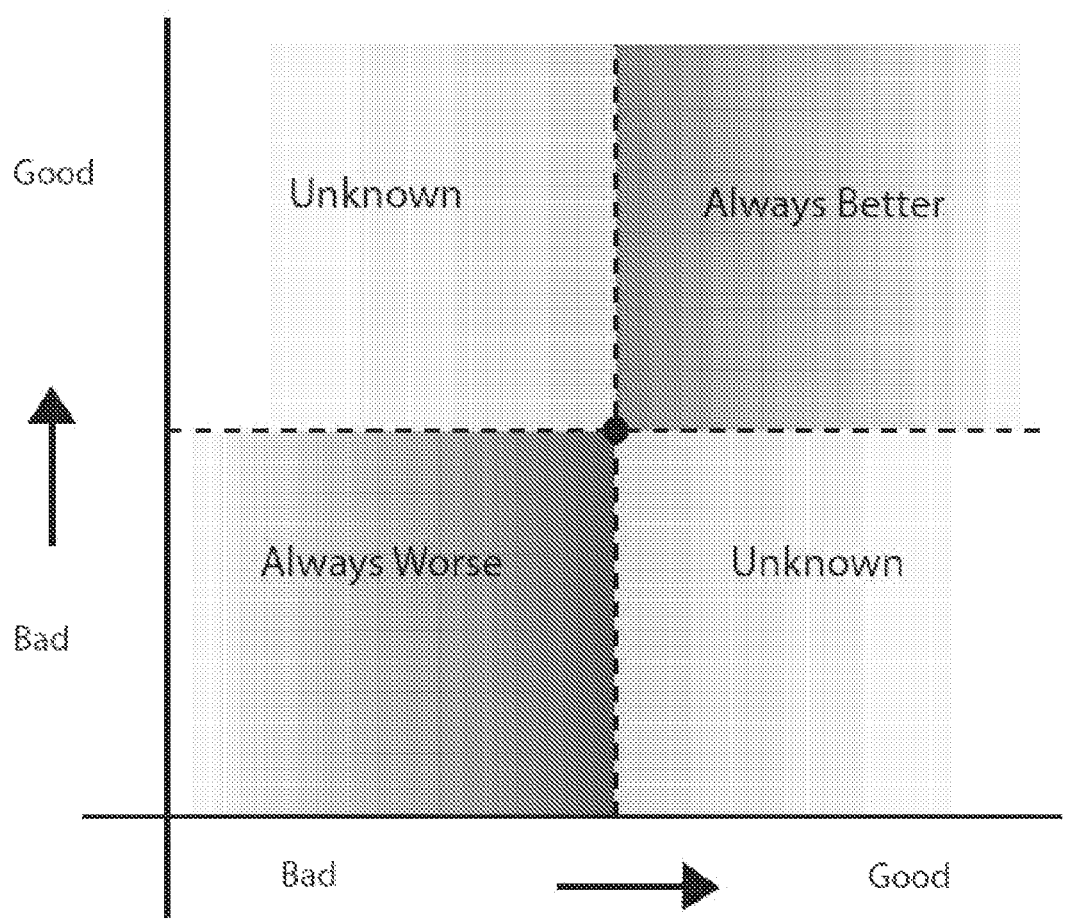
FIG. 2. is an example of a two dimensional plot in accordance with the invention.

FIG. 2 is an example of a two dimensional plot in accordance with the invention. The axes are oriented so that 'better' values are to the right along the x-axis and up in the y-axis. Relative to the point in question, the shaded area to the right and up are points that are considered definitively better as all of these points have values for both x and y. The region to the left and below are considered definitively worse because all of these points have lesser values for both x and y. The regions marked 'Unknown' are not comparable to the point in question. Points in this region are better along one axis while worse on the other. Alternatively, the plot may be oriented so the 'worse' values are to the right along the x-axis and up in the y-axis. The axis orientation is designed so that one quadrant has 'better' values for both x- and y-axis, one quadrant has 'worse' values for both x- and y-axis, and two quadrants are 'Unknown.'

Notably, the value of measure for one metric is distinct from the other metric such that the two different metric values cannot be summed, i.e., there are multiple independent variables. In general, it is not possible to determine a unique optimum when considering multiple independent variables. The inventors, however, are credited with finding a method of determining that certain data sources and/or certain aggregations are less desirable than others.

Figure 3:
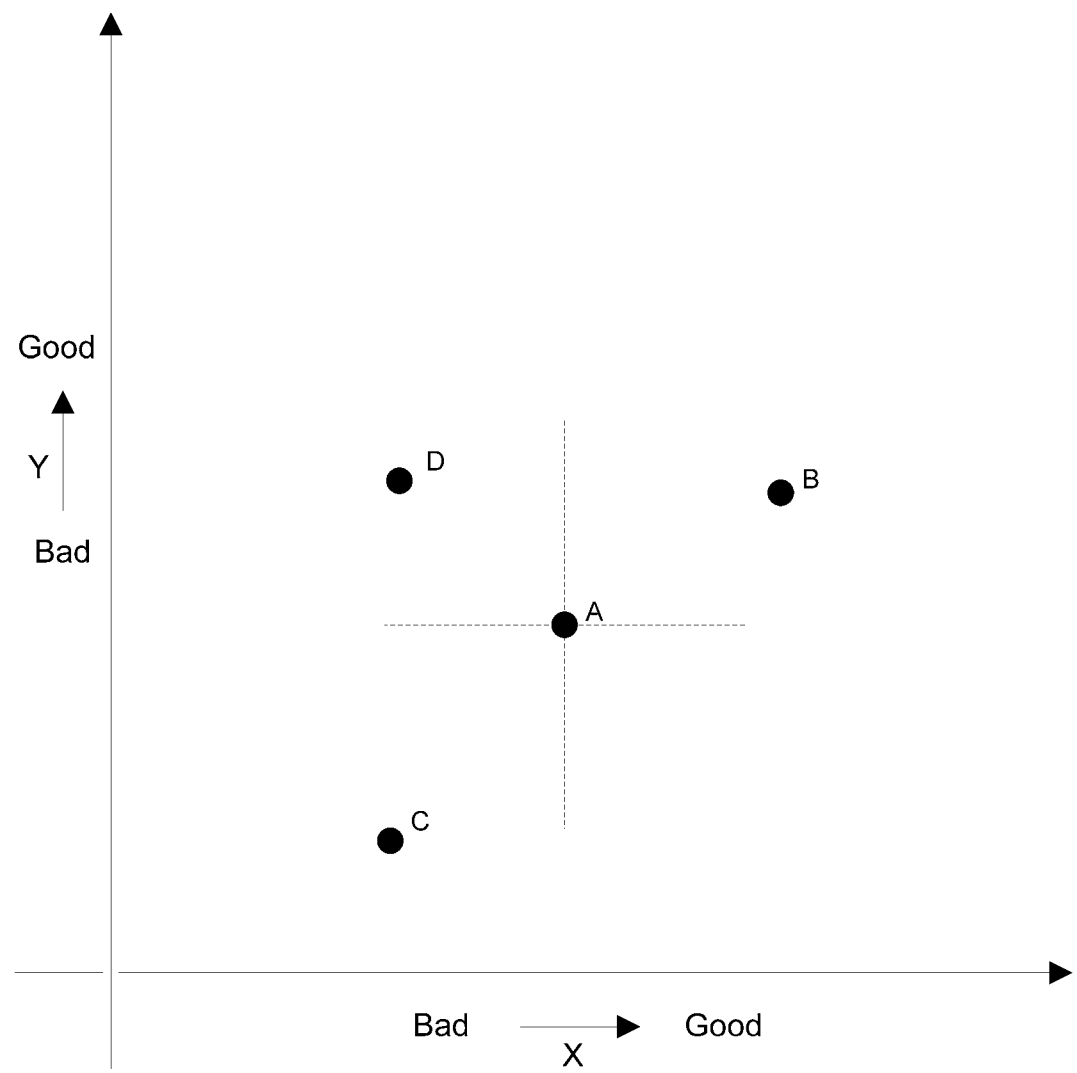
FIG. 3 is an example of a two dimensional plot utilized to determine the frontier data points.

The plotted values are then compared to each other and the inferior values are eliminated. For example, referring to FIG. 3, point B is greater than point A because B has a higher value for both the x- and y-axis. Point A is therefore eliminated. Similarly, point C is less than point A because C is less on both the x- and y-axis. Point C is therefore eliminated. However, point D is not comparable to A. Point D has a higher value on the y-axis, but a lower value on the x-axis. Because D is neither greater than nor less than A, Points A and D are not comparable.

Multivariate optimization resulting from combining data sources leads to a poset with a frontier of incomparable elements. This approach examines all possible aggregations, and then eliminates those that are definitively less desirable. The remaining aggregations form a frontier of non-comparable optima. Thus, the frontier is the set of data combinations that are individually incomparable, but are definitively superior to all other combinations, and the desired solution must be one of these aggregations.

By combining two metrics together, a new type of entity in the form of a poset is created. The members of the poset may be comparable to each other similar to metrics, or they may be incomparable to each other. Analysis of these incomparable poset members results in a Pareto frontier.

The Pareto frontier may be used to identify the optimal combination of data sources. The points on the frontier are reviewed to determine the tradeoff between each pair of points. Points on the frontier are not comparable to each other, this each pair of points may exhibit a tradeoff where moving between points improves the value along at least one axis, while making the value along at least one other axis worse.

Once the frontier pairs have tradeoffs specified, an external source may be used to select the preferred point on the frontier. The external source may be a person, group of people, software application, or other automated means of selecting an optimum among a group of incomparable frontier points. In this manner an optimal data combination is selected because each point is associated with a particular data combination (and permutation within that combination).

In one alternate embodiment, multivariate optimization is not performed in step 104. Thus, step 104 would not address how to combine rows of 1. Instead, the multiple data sets are reviewed to find which sets are integrated together or are chosen. Thus, the best combination is determined but no attempt is made to determine best way of putting combination together.

In step 105, the particular aggregation chosen is determined by a number of factors. First, the aggregation selected can be determined by customer preferences to a particular situation. Second, the trade off of each remaining data point relative to another can be determined. Either computer software or a person must determine what metric along the axis is more important. For example, for Point D, metric Y is higher than Point A but metric X is lower than Point A. Finally, linear regression may be used to develop cost-function based on empirical data from the customer.

The selection of step 105 determines the rules (step 106) which determines the optimal data selection, integration and rank ordering. Notably, the chosen aggregation, or final, selected data set from Step 105, has more than one field. Each data field has a range, i.e., a minimum and maximum. The range is divided into segments. Segment combinations are created through a Cartesian product of all segmented fields.

Each segment combination is analyzed to find how the data sets within that segment are rank ordered and the best, i.e, best valued data set is selected. There is at least one set of rules for every single field.

In a given analysis, each data row is uniquely associated with a segment combination. A segment combination is analyzed by examining each data row associated with the segment combination, and comparing a particular field value within the row to known correct data. A count is maintained for the number of data rows that are correct and incorrect, for a specific field, and for a given segment combination for each data source. A frequency is computed for each segment combination and each data source by dividing the correct count by the sum of the correct and incorrect counts within a particular segment combination and for a particular data source.

This process is repeated for all segment combinations and data fields in the Cartesian product (or the segment combinations of interest). For a given data field, each segment combination is reviewed and a rank order of best performing data source for that field is selected. Rank order of best performing may be an ordering of the data sources from the highest frequency to lowest frequency, or may be determined with other analysis. For example, we may compute the statistical error for the frequency value, and rank order the data sources according to the ratio of frequency value to the statistical variance. Alternatively, other statistical analysis may be included to identify the rank ordering of best performing data source for a particular segment combination.

This is repeated for each segment combination of interest. The result is a matrix identifying a rank ordering of preferred data source for each segment combination for the particular data field. The entire process may be repeated for other data fields.

Once the rank order of best performing preferred data source is identified for each segment combination for a particular field, data integration may begin. Here, the entire data set (not the sample set) is reviewed. We identify the unique rows across all data sources. For each unique row of data (if a row represents an entity, a unique row is a unique entity, and the same entity may be present in multiple data sources), we identify the unique segment combination associated. We determine which data sources have field information present for this row. We select the value of the field from the highest rank order of best performing data sources, and incorporate this into the integrated data. This process may be repeated for every row in the original data.

We may repeat the data integration process for each field of interest. The result is an integrated data source where every unique row appears once, and every field has a single value. Within a single row, the field values present may arise from distinct data sources.

One or more steps of FIG. 1 may be repeated. Thus, in an alternate embodiment, the data elements selected are dependent upon the results of at least one iteration of steps 101-106. Thus, after step 106 is completed, the objectives and priorities for the data elements will also be identified by the line of business owner or function which often would be the data owner or licensee. Next, objectives and priorities may be suggested by the invention based on the data elements or sources and the applicable data quality metrics. Next, objectives and priorities may be suggested by the invention based on previous results obtained from operation of the invention under similar circumstances. The process of FIG. 1 may then be repeated.

In addition, the invention of FIG. 1 has application in several markets, including, for example, the intelligence community ("IC"). The invention also embodies a special feature for the IC which consists of many governmental agencies which obtain data from many different sources and maintain data in many different formats. The general information technology arena provides access to more sources of information today than ever before, yet IC agencies continue to resist sharing or acquiring much of this data because there is no objective way to measure the contribution new sources will make to an existing data set. In other words, "is the data that is being shared adding any real value, is it degrading my data, is it just taking up valuable space?"

Within the framework of the Common Terrorism Information Sharing Standards (CTISS), there are requirements established for a wide variety of sharing capabilities—everything from data format to metadata and XML standards. The missing standard is data quality which largely determines the reliability and intelligent value of the data.

In order to enhance the environment for data sharing, quality measurements should be established within the CTISS in order to apply objective (not subjective) metrics and score the quality of data, creating a "Data Reliability Index." Using this Data Reliability Index, agencies would know the absolute and relative value of each data source, its intelligent life and its predictive power. Any report that is produced can be traced to reveal the data provenance, audited to validate the relevance and scored for reliability to demonstrate why decisions were made.

The invention contains processes, methods and software that objectively measures data by the Data Assurance Dimensions. Recently, the Department of Justice adopted data quality as a policy, but, to date, they have not implemented the policy. The invention process and method practiced with the anticipated result of the Data Reliability Index, will provide a critical tool to removing the obstacles of information sharing among the IC.

Figure 4:
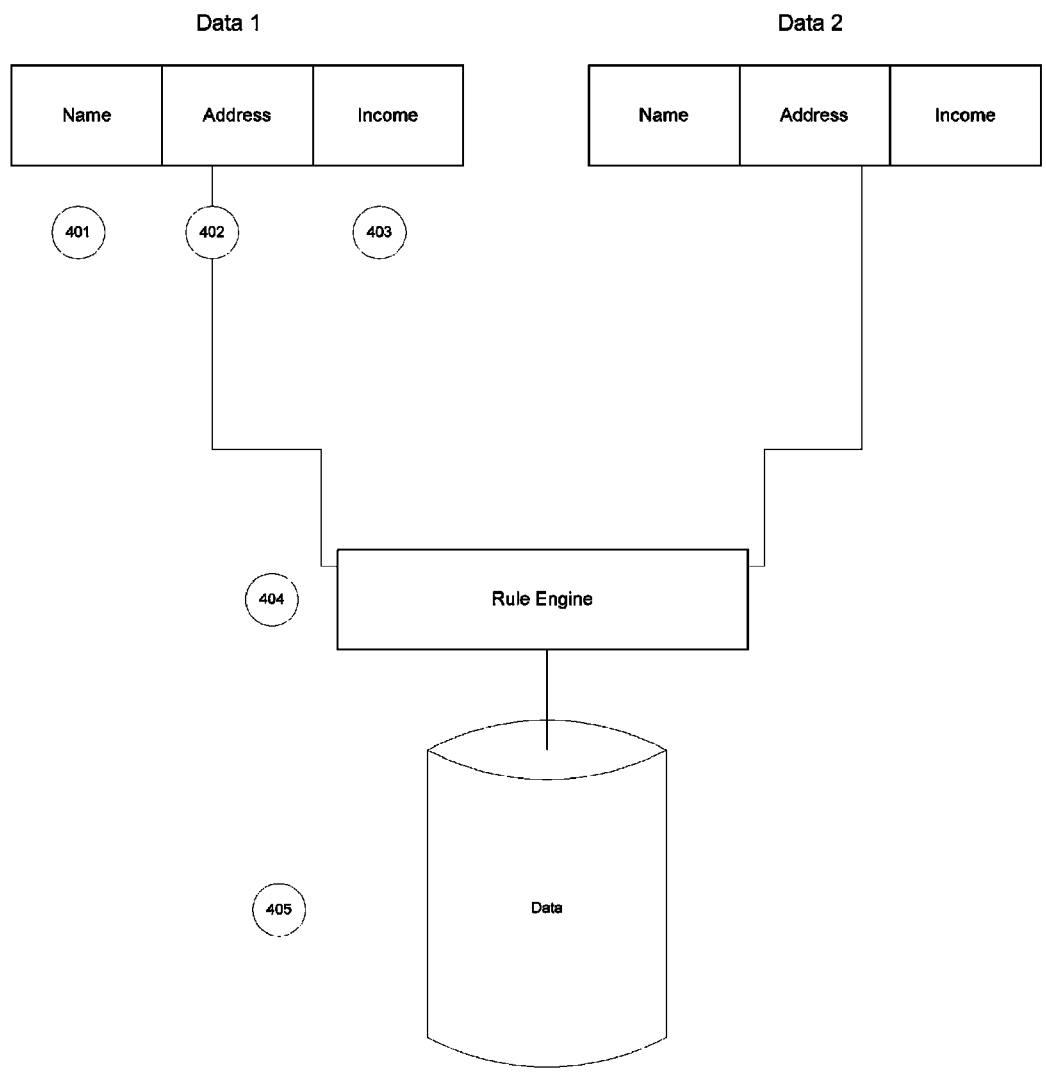
FIG. 4 is a flowchart describing the application of a rules engine to create integrated data.

FIG. 4 illustrates a flowchart describing the application of the rules (step 106) of FIG. 1 to create integrated data. In this example, three data fields are examined: name (Step 201), address (Step 202) and income (Step 203). If the data of Steps 201, 202 and 203 is unique, i.e., only exists in one of the data sets (Data 1 or Data 2), then the data is entered into integrated database. If the data is not unique, i.e., data is present in both Data 1 and Data 2, then the rules engine of Step 204 is used. The rules engine, the output of FIG. 1, rank orders the data of the one or more data sets (fix naming) to choose the optimal data set which is then placed in the database of Step 205.

Figure 5:
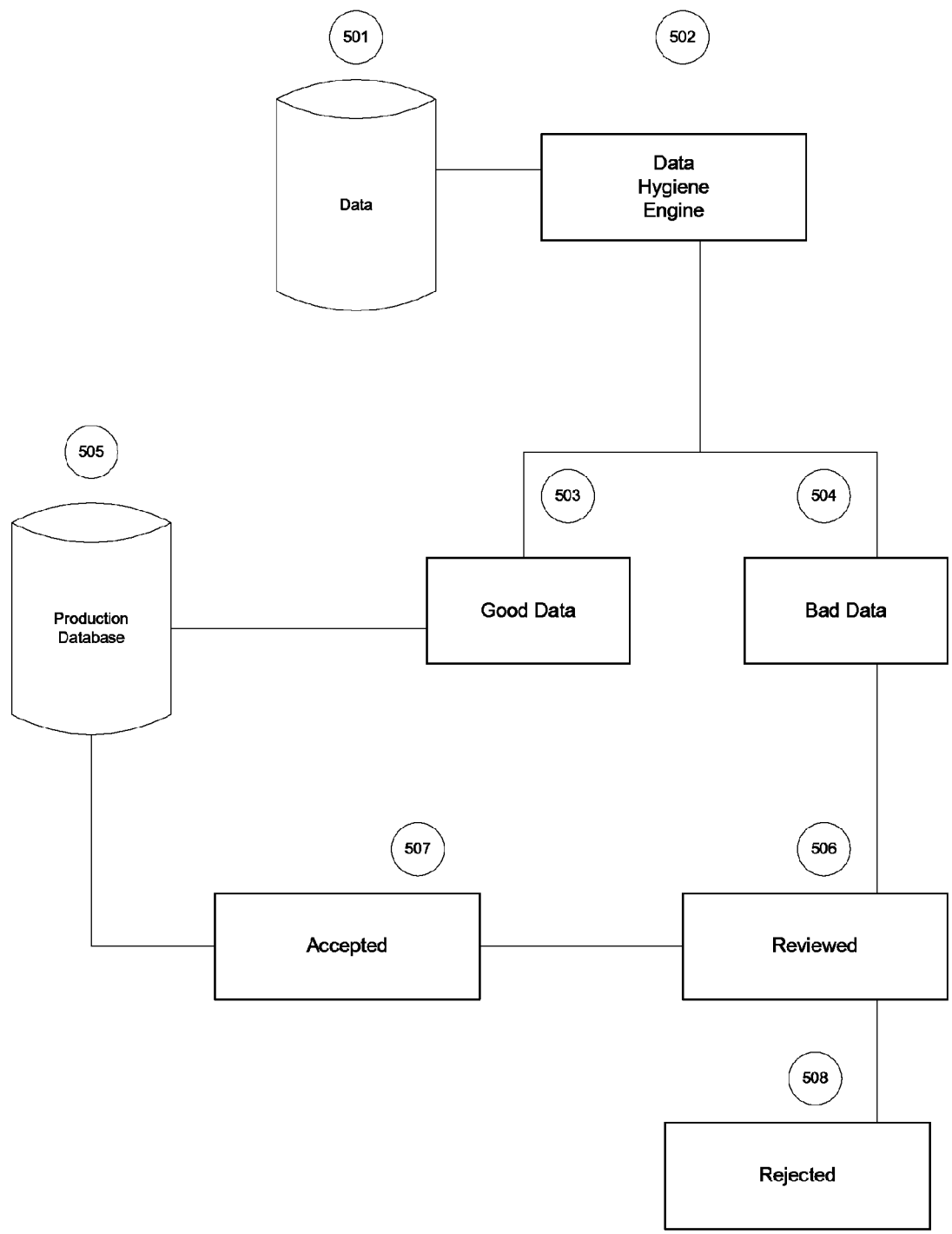
FIG. 5 is a flowchart describing a process or method for data filtering to improve the overall data quality of a data source.

FIG. 5 illustrates a second embodiment of the invention. FIG. 5 is a flowchart describing the process of data filtering to improve the overall data quality of an information source. The data is first inputted into a database in step 501. Data can be inputted by any means, including manual entry, automated inputting data from other database or electronic documents, the like. In step 502, the data is retrieved from the database and processes by a data hygiene engine (DHE). The DHE functions to verify the data in the database is "good" data, and filter out incorrect data from being transmitted to and included in the production database (step 505). Thus, the DHE applies some set of rules to determine whether this information is valid.

Figure 6:
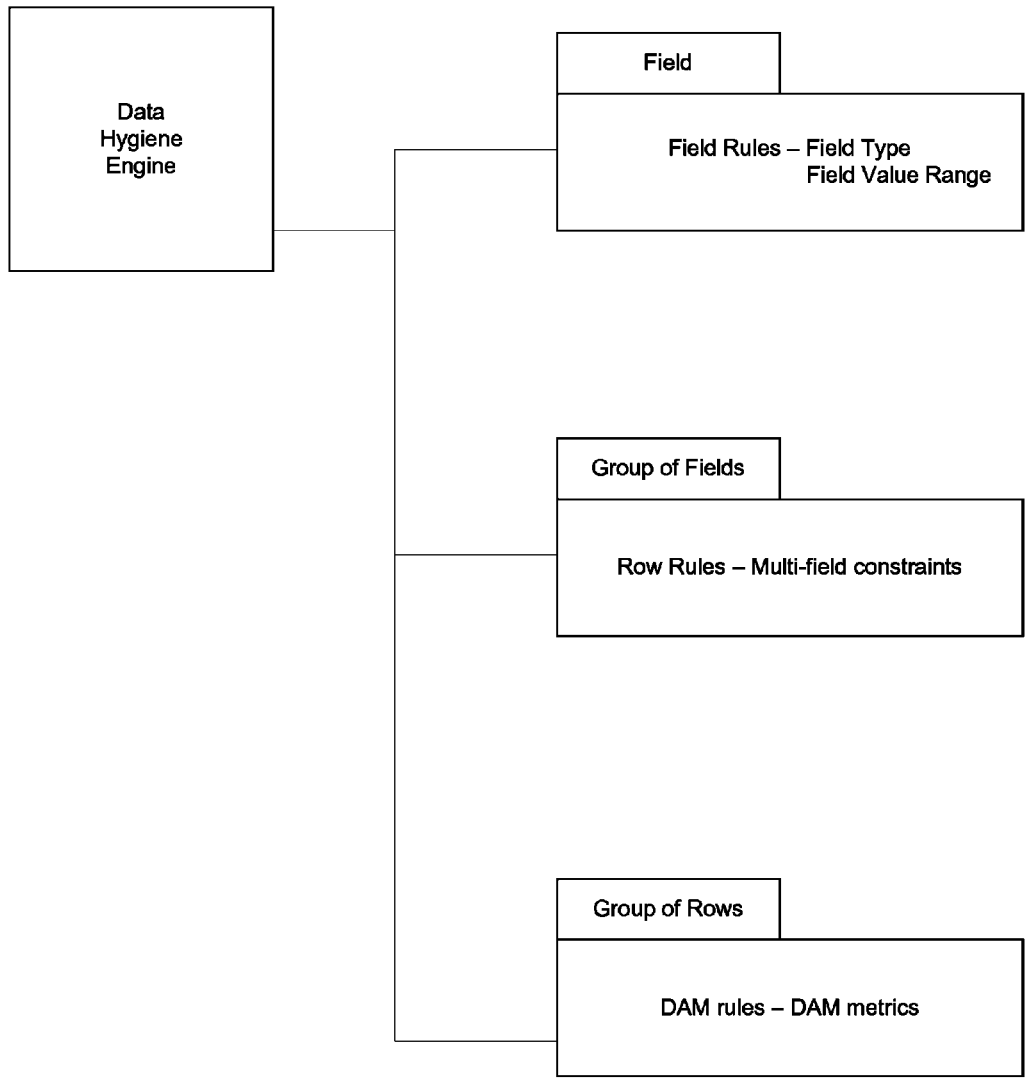
FIG. 6 is a spreadsheet illustrating the difference between a field, group of fields within a row and a group of rows.

The DHE can examine a field, a group of fields within a row or a group of rows as a whole. FIG. 6 illustrates this concept.

First, the DHE can contain field rules. Field rules are rules the engine can completely execute looking only at a single field. For example, the field rule might be field type (integers, doubles/reals, dates, times, date time, string or image). Alternatively, the DHE parameters may be limited to specific a limited set of integers, doubles/reals, dates, times, date time, strings or images. Thus, the DHE used the field rules to confirm that a field for number entry contains numbers, fields approved for characters contains characters, and the like. Alternatively, the DHE may function to prevent duplicate data from being entered.

Field rules also include field value ranges. The field value ranges are a range of field types which are acceptable, such as integer range, time range, date range, string range, and the like.

The DHE may also be configured to have row rules. Row rules are rules the DHE executes to intermix two different fields, thus having multi-field constraints. Here, two or more data fields must be examined together to determine if the two or more data fields are correct or "good data." Examples of row rules are not limiting. In other words, whether a data field is acceptable may be dependent upon another data field. For example, if a person's age is entered as 40 years old, but the height is entered as 21 inches, both data fields would be flagged as "bad" information. Thus, the age range data field must correspond to an approved height range. Another example is matching zip codes with cities. Cities can have multiple zip codes, but to confirm that a zip code data field and city data field in a row are correct, the zip code will have to be compared with the city.

Finally, the DHE may have data assurance management metrics (DAM) rules. DAM rules are data quality metric rules used to analyze groups of rows. The rows are grouped based on some external means for any reason desired by the customer or DHE programmer. For example, the rows may be grouped based on cities, location, numbers, sex, field type (integers, doubles/reals, dates, times, date time, string or image) and the like. Once the rows are grouped, the metrics is calculated for each group. If a group metric computed is metric underneath some critical threshold, the entire group is thrown out. The threshold is determined by the customer or DHE programmer.

DAM rules are very useful because an entity in a database could have multiple data entries or rows. For example, the original databases could have name and address data fields where a name has multiple address entries. A DAM rule might be that if address data fields for Completeness is less than 80%, all rows for that name (entity, group) is bad data and should not be placed in the production database.

By applying DAM rules we can raise the overall metric for the entire data set. For example, group the data into G total groups, and compute the completeness score for each group. In addition, compute the completeness score for the entire dataset. Next, set a minimum threshold for completeness. Eliminate all groups that do not meet or exceed the threshold. The resulting dataset must either be empty or must have a completeness score greater than or equal to the threshold value. With this method we can improve the quality metrics of the data set.

This technique may be used with any of the data quality metrics and is not limited to completeness. Moreover, we may extend the technique to combine a plurality of data metrics together. For example, we may use the two metrics: completeness and accuracy. Both of these are scored on the range [0,1]. We may set a combined rule such as: the sum of the squares of the completeness and accuracy metrics must exceed 0.8. Applying this rule to the groups eliminates some groups and leaves others. In this manner we create a combined constraint metric the we apply to the entire dataset.

Referring again for FIG. 4, the DHE is provided an acceptable range of values or numbers. Data which falls within this acceptable range is flagged as "good data" (step 503) and placed in the production database (step 505). If the data does not fall within the acceptable range, it is flagged as "bad data" (step 504) and subject to an additional review (step 506). The additional review can be conducted by a person, computer and/or additional software. Further, the result of the review can be to modify the data. For instance, the data can be corrected, after which it is accepted (step 507).

Further, a search engine running query may be coupled with DAM threshold. Given a plurality of data sources, a user is queries for information and provides one or more minimum DAM constraints. For example, we may have 30 data sources with name/addresses combinations representing person entities. A user may request to select all name/addresses from the data sources where DAM coverage metric is at least 85%. In this manner, the user is able to not only retrieve the requested information, but can set the reliability and/or confidence thresholds for the data sources. Thus, the user can be confident that the data returned was obtained from data sources of a particular quality.

The flowcharts, illustrations, and block diagrams of FIGS. 1 through 9 illustrate the architecture, functionality, and operation of possible implementations of systems and methods according to various embodiments of the present invention. In this regard, each block in the flow charts or block diagrams may represent a module, electronic component, segment, or portion of code, which comprises one or more executable instructions for implementing the specified function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

The data metrics may be applied to better understand the data itself, rather than to draw conclusions about an underlying application. For example, we may analyze project data to measure the quality of the project related information. This analysis can make conclusions about the project data in isolation. The analysis does not need to draw conclusions about the quality of the projects themselves. The metrics provide a framework for understanding and analyzing the data, in isolation from the purpose behind the data. Conclusions may be drawn to the data without implicating the underlying utility or sources of the data.

Because of this, these processes and methods may be applied to anonymized data. Anonymized data is data that is run through a mapping process to transform it from one form to another while preserving certain aspects of the data. For example, we may use an epimorphic mapping to map names in a database to numbers. Thus, we may replace the name 'Brian' with the number 2, 'Rick' with the number 7, 'Larry' with the number 9, 'John' with the number 2, etc. In this sense we have anonymized the data so we no longer have personally identifiable information residing in the dataset.

As an alternative to the epimorphic map, we may use a map that preserves ordering. Continuing with the example, we map 'Brian' to 2, 'Rick' to 7, 'Larry' to 5, and John to '4'. With this mapping, not only have we removed personal name information, we have preserved the lexigraphical ordering of the names. Sorting the names we have 'Brian', 'John', 'Larry', and 'Rick'. Similarly, their corresponding numbers are 2, 4, 5, and 7. Thus, we can sort the mapped list and know that the relative ordering is the same as if we had sorted the original list.

Using these techniques, we can create anonymizing routines that preserve one or more aspects of the original data. The data metrics may be applied to the resulting, anonymized data, and will compute the exact same scores as we would have found if we computed the metrics directly from the original data.

This is useful because we can perform the full analysis using these metrics without ever needing to review sensitive information. The data source owner can perform these mappings on the original data to transform it to anonymized data. The resulting anonymized data may be shared externally without needing to share the mappings used to create the anonymized data. If the mappings use an epimorphic map, it is mathematically impossible for the anonymized data to be reverse engineered to obtain the original data. We may use the externally shared data to perform a data assurance management analysis, compute metrics, etc. These metrics have the same value as we would have found if we had worked with the original data. Thus, we may perform the entire data quality analysis without ever needing to review the original data.

In the drawings and specification, there have been disclosed typical illustrative embodiments of the invention and, although specific terms are employed, they are used in a generic and descriptive sense only and not for purposes of limitation, the scope of the invention being set forth in the following claims It should be apparent from the foregoing that an invention having significant advantages has been provided. While the invention is shown in only a few of its forms, it is not just limited to those described but is susceptible to various changes and modifications without departing from the spirit thereof.

Example 1

Example 1 describes the process of combining three data sources along with their cost and number of unique records, to examine the cost and number of unique records for each combination.

TABLE 1

Example data sets showing the cost of each data set and the number of unique records provided in the data set.

| Data Source | Cost | Unique Records |
|---|---|---|
| A | $10 | 15,000 |
| B | $15 | 25,000 |
| C | $20 | 10,000 |

There are seven possible combinations: (A), (B), (C), (AB), (AC), (BC), and (ABC). For each combination the total cost and the number of unique records needs to be calculated. The total cost for a particular combination is simply the sum of the costs of each data set making up the combination, where this value is in Table 1.

However, the total number of unique records cannot be determined from Table 1 because there may be overlap between the data sources that comprise the combination. For example, the combination (AB) has at least 25,000 unique rows because B alone has this many unique rows. Further, there can be at most 40,000 unique rows if there is no overlap between A and B. The combination may have any number of unique records from 25,000 to 40,000.

Table 2 presents the cost and number of unique records for each combination of data sources from Table 1. The number of unique records was computed by creating a sample set and counting the actual number of unique records that result from the combination. However, generating a different data sample would result in a different number of unique rows in the combinations.

TABLE 2

The cost and number of unique records for each combination of data sources from the previous table.

| Combination | Cost | Unique Records |
|---|---|---|
| A | $10 | 15,000 |
| B | $15 | 25,000 |
| C | $20 | 10,000 |
| AB | $25 | 35,510 |
| AC | $30 | 22,037 |
| BC | $35 | 30,036 |
| ABC | $45 | 36,102 |

Figure 8:
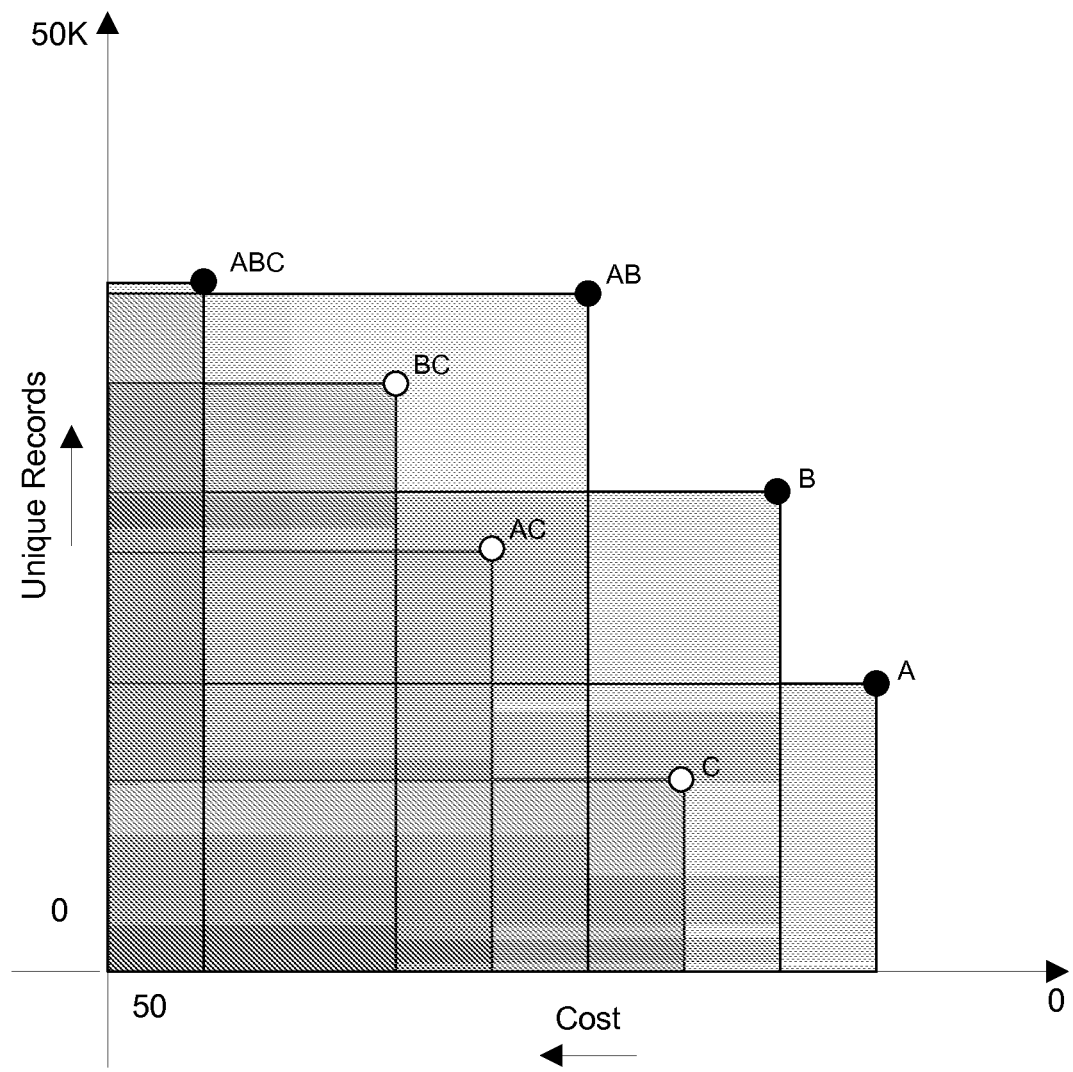
FIG. 8 is an example of a two dimensional plot utilized to compare frontier data points.

The results of combining these data sets are plotted in FIG. 8. First, it is important to note that the cost axis (x-axis) runs from high to low. This is because low cost is considered beneficial in this case, and we want the x- and y-axis to run from 'bad' to 'good'. In FIG. 8, the gray boxes indicate regions that are definitively worse with respect to a given point. Points lying within a gray box have worse values on both the x- and y-axis than some other point.

For example, the point C lies within the box for A. Examining Table 2, C has both a worse value for the y-axis (number of unique rows: C(10,000) worse than A(15,000)) and a worse value for the x-axis (cost: C($20) worse than A($10)). Thus, data set A would always be chosen over data set C. Data set C would not be selected by itself when there is another data set that is better in all aspects.

Some points in FIG. 8 are not comparable to each other. For example, points B and A are not comparable because neither point lies within the gray box of the other. Looking at Table 2, point A is better along the x-axis (cost: A($10) better than B($15)), but B is better along the y-axis (number of unique records: B(25,000) better than A(15,000)). In this case it cannot be determined whether A is better than B or vice-versa. Points A and B are simply not comparable.

Examining FIG. 8, three of the data combinations are definitively worse than another combination. Combination BC is worse than AB, combination AC is worse than both B and AB, and C is worse than both A and B. To optimize both cost and the number of unique records, BC, AB, or C would never be chosen. In each case there is another data combination that is definitively better. Thus, these data sets are eliminated from further consideration.

Eliminating the definitively worse combinations leaves four remaining points (represented as dark circles in FIG. 8). These points are all incomparable to each other. There is no mathematical way to determine which of these is the best. These points form a data frontier that creates a boundary for the data combinations.

Although the unique optima cannot be determined among the points on the frontier, the tradeoffs between the points are examined. For example, point A and point B are compared, showing that for a marginal cost increase of $5 (B($15)−A($10)) one gains the marginal benefit of 10,000 unique rows (B(25,000)−A(15,000)). An entity or person may consider this tradeoff desirable, or they may consider it not worth the price. However, this preference cannot be determined based on the data alone. At this point the preferences of the data consumer are examined to determine the optimal tradeoff point along the frontier.

In two dimensions (cost v. number of unique rows) the points on the frontier can be sorted. The points can be sorted by cost or by the number of unique rows. Both sorting provide essentially the same list. Sorting cost from best to worst gives: A, B, AB, and ABC. Sorting number of unique rows from best to worst gives: ABC, AB, B, and A. This sorting was then used to construct a table showing the marginal cost and marginal benefit for moving from one point to the next. See, Table 3.

The cost-benefit analysis is useful for determining the right data combination for a particular data consumer. By identifying the frontier and eliminating those points not on the frontier, the analysis is focused on the frontier points and a cost-benefit analysis for each frontier point is performed. The preferences of the individual data consumer will determine where on the cost-benefit curve (the frontier) is the best fit.

TABLE 3

The frontier data combinations are presented with the marginal cost (Cost Increase) and marginal benefit (Additional Unique Rows). The final column shows the ratio of the marginal benefit to the marginal cost.

| Initial/Final Point | Cost Increase | Additional Unique Records | Additional Unique Records/Cost Increase |
|---|---|---|---|
| A->B | $5 | 10,000 | 2,000 |
| B->AB | $10 | 10,510 | 1,051 |
| AB->ABC | $20 | 592 | 29.6 |

Table 3 shows the results of examining the marginal cost and marginal benefit between points on the frontier. Starting from A and moving to B, a cost increase of $5 is incurred with the benefit of $10,000 unique records. This transition produces 2,000 additional records per $1 spent. Moving from B to AB, the cost increases by $10 with 10,510 additional unique records. However, for this transition only 1,051 additional records are received per $1 spent. Finally, in moving from AB to ABC, an additional $20 in cost is incurred to obtain 592 additional unique records. This transition produces only 29.6 new records per $1 spent.

The transitions between points on the frontier in order to understand the available tradeoffs. However, only the preferences of the data consumer can determine which of the points along the frontier are best suited.

Formalization of the Data Frontier

Examining of an optimization problem occurs with an arbitrary number of dimensions. Each dimension is self comparable meaning that for a particular dimension in that low (high) values are less preferred to high (low) values. For a particular dimension it does not matter whether low or high values are preferred, only that there exists an ordered preference and as we move from one value to another we can say determine if the direction of movement is preferred or not.

The symbols $\prec$ and $\succ$ are used to indicate that values are less or more preferred. For example, examining the number of unique records from Table 2, A$\prec$B, indicating that B is more preferred than A. Similarly, examining cost, B$\prec$A because the cost for A($10) is more preferred than the cost for B($15). We use $\prec$ instead of < to avoid confusion that we are comparing values in the traditional sense. In value terms, A<B. In preference terms, B$\prec$A.

Each of the dimensions under consideration is ordered and plotted according to preferences for that dimension. Hence, number of unique records would typically be sorted from low values to high values, whereas cost would typically be sorted from high values to low values (similar to FIG. 8).

Next points in this n-dimensional space are compared. Each point (data combinations from the previous example) represents a particular combination of values of each of the n-dimensions. For instance, for the two points: $P_1$ and $P_2$ the value of each dimension of $P_1$ is represented as $P_{1i}$ where i=1, 2, 3 ... n, and the value for each dimension of $P_2$ is $P_{2i}$. $P_1$ is considered definitively better than $P_2$ if and only if $P_1$ is preferred to $P_2$ in every dimension. If $P_1$ is definitively better than $P_2$, then $P_1 > P_2$ or $P_2 < P_1$.

If $P_1$ is preferred to $P_2$ in every dimension except one then imagine FIG. 8 that there was some other point D that was exactly on the boundary of the gray box for point A. For instance, say D had a cost of $10 (exactly the same as A), but the number of unique records was 10,000 (less than A). In this case A is still preferred over D because A is better in all other respects. In general, if points A and D are equal in some number of dimensions, but one A is preferred in all other dimensions, then A$\succ$D. If points have some of the same values, the symbol $\preccurlyeq$ is used meaning 'less preferred or equal to'. If two points have the same value for every dimension, the symbol $\Rightarrow$ is used. Thus if A$\asymp$D, then A and D must have the same value for every dimension.

Mathematically, $$A \prec B \Rightarrow \{A_i \preccurlyeq B_i \forall i=1,2,\ldots,n\} \wedge A \not\equiv B \qquad 1$$

where n is the number of dimensions under consideration. Equation 1 is read 'A less preferred than ($\prec$) B implies that ($\Rightarrow$) $A_1$ is less preferred or equal to ($\preccurlyeq$) $B_1$ for every ($\forall$) i=1, 2 ... n and ($\wedge$) A is not equivalent to ($\not\equiv$) B'.

Similarly, $$A \prec B \Rightarrow \{A_i \preccurlyeq B_i \forall i=1,2,\ldots,n\} \wedge A \not\equiv B \qquad 2$$

$$A \asymp B \Rightarrow \{A_i \asymp B_i \forall i=1,2,\ldots,n\} \qquad 3$$

The concept of not-equivalent-to ($\not\equiv$) arises from negating equation 3:

$$A \not\equiv B \Rightarrow \{\exists i | A_{\downarrow} i \not\equiv B_{\downarrow} i\} \qquad 4$$

This is read 'A not equivalent to B implies ($\Rightarrow$) there exists ($\exists$) an I such that (|) $A_i$ is not equivalent to ($\not\equiv$) $B_i$'. Again, the preference and equivalence of the overall points is determined by examining the preference of each individual dimension comprising the point.

Concepts such as 'less preferred or equivalent to' and 'more preferred or equivalent to' are defined:

$$A \preccurlyeq B \Rightarrow A \prec B \vee A \asymp B \qquad 5$$

$$A \preccurlyeq B \Rightarrow A \succ B \vee A \asymp B \qquad 6$$

where the symbol $\vee$ (read or) is a logical OR. Essentially, the first states that A$\preccurlyeq$B means that either A$\prec$B or A$\asymp$B. Similarly, A$\succcurlyeq$B means either A$\succ$B or A$\asymp$B.

Examine two points for an individual dimension (for example cost). Let a and b represent values (not necessarily different) for this dimension. In order for the dimension to be validly ordered, every two values for the dimension must obey one of the following relations:

$$a \prec b$$

$$a \asymp b$$

$$a \succ b \qquad 7$$

In other words, when examining one dimension alone, for any two values for the dimension, a and b, a is preferred to b, b preferred to a, or a equivalent to b. For example, when looking at cost alone, for any two values of cost it must be the case that either one value is preferred to another, or they are the same.

Since there are only three possibilities for comparing an individual dimension, there are exactly four possible outcomes from equations 1-3 when comparing two points:

$$A \prec B$$

$$A \asymp B$$

$$A \succ B \qquad 8$$

A, B not comparable

For two points A and B, A may be less preferred than B, A may be equivalent to B, A may be preferred to B, or A and B may not be compared. Two points will be not comparable when one point has a preferred value for one dimension while the other point is more preferred in another dimension. Any two points must fall into exactly one of these four categories. Points cannot simultaneously obey two or more.

The properties from 8 are sufficient to form a poset. A poset is a partially ordered set. Mathematically, a poset is a formed on a set when there exists a binary relation between members of the set such that reflexivity $a \preccurlyeq a$      9 antisymmetry $a \preccurlyeq b * b \preccurlyeq a \Rightarrow a \asymp b$      10 transitivity $a \preccurlyeq b * b \preccurlyeq c \Rightarrow a \preccurlyeq c$      11 where a, b, and c are all members of the set.

Each of these relations is met based on equations 1-3 (along with 4-6 which arise from 1-3). First, the reflexivity relation is met from equation 5 by comparing A with itself:

$$A \preccurlyeq A \Rightarrow A \prec A \vee A \asymp A \qquad 12$$

If $A \preccurlyeq A$, then either $A \prec A$ (which cannot be true from equation 1) or $A \asymp A$ (which is true from equation 3). Since $A \asymp A$, $A \preccurlyeq A$.

For the antisymmetty relation, we examined two points A and B such that $A \preccurlyeq B$ and $B \preccurlyeq A$. From equations 5 and 6:

$$A \preccurlyeq B \Rightarrow A \prec B \vee A \asymp B \qquad 13$$

$$A \preccurlyeq B \Rightarrow A \succ B \wedge A \asymp B \qquad 14$$

These are both satisfied if $A \asymp B$. It was also determined that it was impossible to satisfy these when $A * B$? To find this, we assumed that $A * B$. From 13, if $A * B$ then $A \prec B$. From 14, if $A * B$ then $A \succ B$. However, if the dimensions underlying the points are well ordered, then any two points must meet exactly one of the criteria from equation 8. Thus, if $A * B$, then two of the criteria from 8 are simultaneously satisfied: $A \prec B$ and $A \succ B$. This is impossible, so the initial assumption that $A * B$ is false, which means that $A \asymp B$.

Finally, the transitivity relation states if $A \preccurlyeq B$ and $B \preccurlyeq C$ then $A \preccurlyeq C$. This is broken into four cases: $A \asymp B$ and $B \asymp C$, $A \asymp B$ and $B * C$, $A * B$ and $B \asymp C$, and $A * B$ and $B * C$.

Case 1: $A \asymp B$ and $B \asymp C$

If $A \asymp B$ then from equation 3, $A_i \asymp B_i \forall i=1, 2, \ldots n$. Similarly, if $B \asymp C$ then $B_i \asymp C_i \forall i=1, 2, \ldots, n$. But for each dimension, if $A_i \asymp B_i$ and $B_i \asymp C_i$ then $A_i \asymp C_i$. If $A_i \asymp C_i \forall i=1, 2, \ldots, n$ then $A \asymp C$ and from equation 5 $A \preccurlyeq C$.

Case 2: $A \asymp B$ and $B * C$

If $A \asymp B$ then from equation 3, $A_i \asymp B_i \forall i=1, 2, \ldots n$. Earlier it was found that $B \preccurlyeq C$, so if $B * C$ then $B \prec C$. But since $A \asymp B$, this means that $A \prec C$ and thus $A \preccurlyeq C$.

Case 3: $A * B$ and $B \asymp C$

If $B \asymp C$ then from equation 3, $B_i \asymp C_i \forall i=1, 2, \ldots n$. Further, $A \preccurlyeq B$, so if $A * B$ then $A \prec B$. But since $B \asymp C$, this means that $A \prec C$ and thus $A \preccurlyeq C$.

Case 4: $A * B$ and $B * C$

If $A * B$ and $A \preccurlyeq B$ then $A \prec B$. Similarly, if $B * C$ and $B \preccurlyeq C$ then $B \prec C$. If $A \prec B$ then $A_i \preccurlyeq B_i \forall i=1, 2, \ldots n$. Also, if $B \prec C$ then $B_i \preccurlyeq C_i \forall i=1, 2, \ldots n$. But for an individual dimension, if $A_i \preccurlyeq B_i$ and $B_i \preccurlyeq C_i$ then $A_i \preccurlyeq C_i$. Thus, $A_i \preccurlyeq C_i \forall i=1, 2, \ldots n$ so $A \prec C$ and thus $A \preccurlyeq C$.

Figure 9:
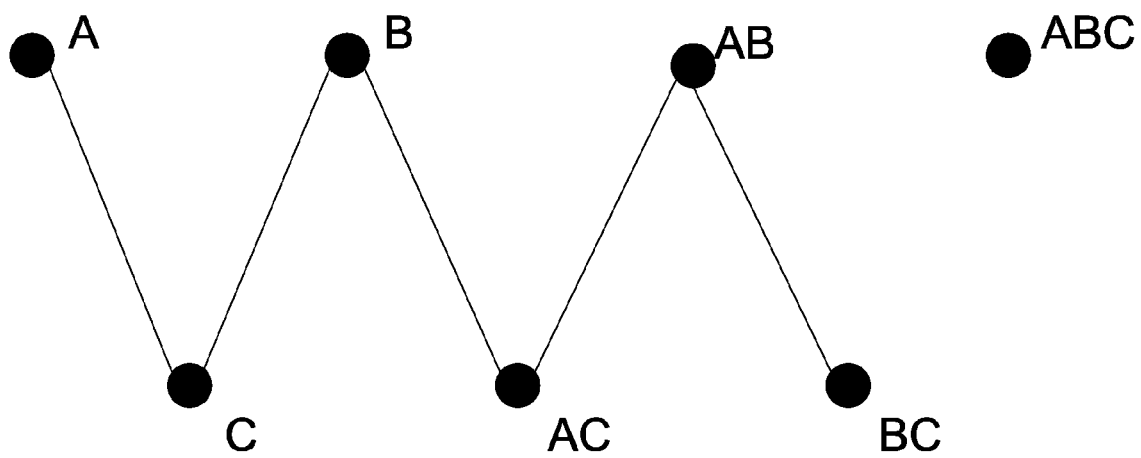
FIG. 9 is an example of a Haase plot utilized to determine the frontier data points.

Thus, as shown in equations 1-6, the relations for a poset are satisfied. From this, the results and analysis of posets are used and applied to multidimensional optimization. FIG. 9 shows a Hasse diagram, where each element of the set is represented by a point lines are drawn between points indicating how they compare. If a and b are points in a Hasse diagram where a<b, then a and b are connected if there is no other point c such that a<c and c<b. FIG. 9 provides a Hasse diagram for the preferences shown in FIG. 8.

The Hasse diagram provides an easy mechanism to find the frontier. In general, any point that is at the top of a Hasse diagram is on the frontier. These points are either not comparable to any other point (ABC in FIG. 9) or they are preferred to some other set of points. Any point that is connected upward to another point (C, AC, and BC in FIG. 9) is not on the frontier.

Example 2

An analysis of five different sources injecting the dimension of Completeness is below. Each source file was selected on the same set of geographic criteria. For purposes of this analysis, the five elements were chosen by the customer: Name, Address, Phone, Income Level and Presence of Credit. Baseline sources are selected based solely on the completeness dimension; no other factors were considered for purposes of this report. The analysis matrix is generated by comparing each of the four remaining sources with the baseline source, element by element.

|    | Total Number of Records | Number of Duplicate Records | Number of Unique Records | Percentage of Unique Records | Price per Thousand Records |
|----|---|---|---|---|---|
| S1 | 4 million | 234,987 | 3,765,013 | 94.13% | $8 |
| S2 | 1.4 million | 89,789 | 1,310,211 | 93.59% | $5 |
| S3 | 4.7 million | 126,430 | 4,573,570 | 97.00% | $4 |
| S4 | 4.9 million | 908,950 | 3,991,050 | 81.45% | $9 |
| S5 | 3.2 million | 276,741 | 2,923,259 | 91.35% | $6 |

In this instance, a consistent ID was not provided. A deduplication process based solely on Name (using character string matching only) was conducted.

It was determined that Source 3 (S3) had the largest number of unique records among all five sources and also had the largest percentage of unique records with 97.31%. Therefore, S3 was set as the baseline source in the name field only. Subsequent comparisons, using the same methodology, were completed on each source creating a different baseline source for each element.

|    | Name Unique Records | % | Address Complete | % | Phone Complete | % | Income Complete | % | Credit History Complete | % |
|----|---------------------|---|------------------|---|----------------|---|-----------------|---|--------------------------|---|
| S1 | 3,765,013 |        | 3,332,156 | 83.30% | 3,388,512 | 84.71% | 1,940,475 | 48.51% | 2,055,990 | 51.40% |
| S2 | 1,310,211 |        | 1,005,394 | 71.81% | 1,143,814 | 81.70% | 736,339   | 52.60% | 888,323   | 63.45% |
| S3 | 4,573,570 |        | 3,185,900 | 67.79% | 1,765,560 | 37.57% | 2,267,379 | 48.24% | 2,446,037 | 52.04% |
| S4 | 3,991,050 |        | 3,197,478 | 65.25% | 3,678,360 | 75.07% | 1,912,458 | 39.03% | 2,112,144 | 43.10% |
| S5 | 2,923,259 |        | 2,515,221 | 78.60% | 2,148,595 | 67.14% | 2,022,895 | 63.22% | 1,543,481 | 48.23% |

B. Element Profile

After the benchmark file has been established, the next step compared each source of data, element by element, beginning the benchmarking with "Name," then identifying the duplicates to determine an accurate actual contribution level of each file. For example, the table below shows that there are a total of 4,573,570 unique records in the baseline source for names (Source 3) and a comparison with Source 1 (S1) shows that S1 contributed 798,111 unique records. The total of these two becomes the benchmark for the next iteration of comparison (Source 2, Source 4, etc.). This table illustrates the results of an element-by-element comparison of the five sources.

| Address | Value | Percentage |
|---------|-------|------------|
| S1      | 3,332,156 | 83.30% |
| S2      | 11,457    | 0.82%  |
| Total   | 3,343,613 |        |
| S1      | 3,332,156 |        |
| S3      | 201,574   | 4.29%  |
| Total   | 3,533,730 |        |
| S1      | 3,332,156 | 83.30% |
| S4      | 203,391   | 4.15%  |
| Total   | 3,535,547 |        |
| S1      | 3,332,156 | 83.30% |
| S5      | 139,201   | 4.35%  |
| Total   | 3,471,357 |        |

| Name  | Value | Percentage |
|-------|-------|------------|
| S3    | 4,573,570 | 97.31% |
| S1    | 798,111   | 19.95% |
| Total | 5,371,681 |        |
| S3    | 5,371,681 |        |
| S2    | 16,745    | 1.20%  |
| Total | 5,388,426 |        |
| S3    | 5,388,426 |        |
| S4    | 312,388   | 6.38%  |
| Total | 5,700,814 |        |
| S3    | 5,700,814 |        |
| S5    | 238,318   | 7.45%  |
| Total | 5,939,132 |        |

| Phone | Value | Percentage |
|-------|-------|------------|
| S4    | 3,678,360 | 75.07% |
| S1    | 678,521   | 16.96% |
| Total | 4,356,881 |        |
| S4    | 4,356,881 |        |
| S2    | 7,132     | 0.51%  |
| Total | 4,364,013 |        |
| S4    | 4,364,013 |        |
| S3    | 65,560    | 1.39%  |
| Total | 4,429,573 |        |
| S4    | 4,429,573 |        |
| S5    | 143,722   | 4.49%  |
| Total | 4,573,295 |        |

| Income | Value | Percentage |
|--------|-------|------------|
| S3     | 2,267,379 |        |
| S1     | 298,567   | 7.46%  |
| Total  | 2,565,946 |        |
| S3     | 2,565,946 |        |
| S2     | 15,897    | 1.14%  |
| Total  | 2,581,843 |        |
| S3     | 2,581,843 |        |
| S4     | 267,231   | 5.45%  |
| Total  | 2,849,074 |        |
| S3     | 2,849,074 |        |
| S5     | 131,367   | 3.93%  |
| Total  | 3,080,441 |        |

| Credit History | Value | Percentage |
|----------------|-------|------------|
| S3             | 2,446,037 | 52.04% |
| S1             | 290,755   | 7.27%  |
| Total          | 2,736,792 |        |
| S3             | 2,736,792 |        |
| S2             | 10,725    | 0.77%  |
| Total          | 2,747,517 |        |
| S3             | 2,747,517 |        |
| S4             | 201,678   | 4.12%  |
| Total          | 2,949,195 |        |
| S3             | 2,949,195 |        |
| S5             | 67,208    | 2.29%  |
| Total          | 3,116,403 |        |

C. Summary Findings and Recommendations

For this hypothetical example analysis, the heaviest weight was given to the Income element. Based on these results, Source 3 (S3) should be considered the overall baseline file with respect to completeness. However, relatively low contributions in the address and phone elements force more augmentation than might normally be necessary. The outcome is that the completeness percentages be leveraged to negotiate a more favorable pricing package in future buys.

Below is a matrix depicting a rank order of the data sources based solely on completeness and with a weight placed on Income and Credit History.

| File | Name | % Lift | Address | % Lift | Phone | % Lift | Income | % Lift | Credit History | % Lift |
|------|------|--------|---------|--------|-------|--------|--------|--------|----------------|--------|
| S3 | 4,573,570 |  | 201,574 | 4.29% | 65,560 | 1.39% | 2,267,379 |  | 2,446,037 |  |
| S1 | 798,111 | 19.90% | 3,332,156 |  | 678,521 | 16.96% | 298,567 | 7.46% | 290,755 | 7.27% |
| S4 | 312,388 | 7.23% | 203,391 | 4.15% | 3,678,360 |  | 267,231 | 5.45% | 201,678 | 4.12% |
| S2 | 16,745 | 1.20% | 11,457 | 0.82% | 7,132 | 0.51% | 15,897 | 1.14% | 10,725 | 0.77% |
| S5 | 136,783 | 4.54% | 139,201 | 4.35% | 143,722 | 4.49% | 131,367 | 3.93% | 67,208 | 2.29% |

Further, based solely on completeness and actual contribution, Source 2 and Source 5 are deleted. In terms of unique names provided, Source 2 provides 1.2% lift while Source 5 provides just over 4.5%. The additional elements analyzed provide even more evidence that the sources are not providing substantive contributions. Neither source provides substantial lift in address, phone, income, or presence of credit history.

Based on the data costs provided by the customer, the elimination of Source 2 and Source 5 will result in savings. An important caveat to note is that Source 5 is the most expensive file given a cost of $6 per thousand but the file does contribute over 131,000 unique income records and more than 67,000 unique presence of credit records. Based on customer value and retention models, the client may determine there is a value to retaining S5.

Example 3

Scientific or environmental data, especially which collected on a massive scale by persons who are not professional scientists, may also be the subject of data assurance management. In this example, data assurance management was applied to the collection, processing, storage and later use of large quantities of scientific and environmental data.

The data collector was a company for science and environmental data collectors ("SEDC") engaged to collect and report data for air, soil, tar ball and water sampling activities being conducted as a result of a massive off shore oil spill and where there are approximately 2,500 data collection points spanning a geographic area along the Gulf Coast from New Iberia, La. to Tallahassee, Fla. Over 20 teams consisting of approximately 800 people collected and reported data samples every fifteen (15 minutes).

SEDC also managed several other data streams related to the project:

Off-Shore Vessel AreaRAE Data (71 AreaRAE Units)
Off-Shore Vessel Passive Dosimeter Badge Results (120 samples per day)
On-Shore Staging Area Passive Dosimeter Badges (120 samples per day) and
SCAT Tar Ball Sampling Data.

All incoming field data, whether collected on paper or via the MC-55 EDA, was imported or entered into SEDC's local scribe database. Appropriate data was then pushed to the Environmental Protection Agency's (EPA) Scribe.NET off-site enterprise database to share with local and federal authorities. SEDC responded to operational and response data requests using on-site Scribe databases.

Numerous data and data sources needed to the invention of FIG. 4 implemented and the resulting data integrated into a data warehousing solution to avoid disparate silos of information and data. The oil company, the EPA, the US Coast Guard, the Department of Homeland Security, and other government regulators cannot make enterprise level decisions because the data does not give them the complete picture—environmental readings are in multiple databases, worker access and job roles are in other databases, etc.

The objective was to have all of these data streams, including all foundation or provenance data, processed under the invention and installed in a single data repository or data warehouse.

The demands of collecting, processing and using the data required a new architecture of a single data warehouse for data capture and management that would:

Allow users to access appropriate data to make queries, run reports and make decisions on a near real-time basis
Allows decision makers to determine the reliability and absolute value of each data source
Allow decisions to be made at an enterprise level rather than through silos of data
Allow companies to continue to implement their best practice data collection efforts without interrupting their process, while still being able to make data contributions to the warehouse
Create a flexible environment that will allow any reporting or mapping tool to utilize all of the permissible data Individual companies and reporting tools, such as EQuIS, needed to be able to continue their best practice of analytics and reporting without having to adapt to new data formats or parameters.

The implementation of data assurance management and the design of the data warehouse was to ensure the flexibility that will enable reporting tools (EQuIS), appropriate agencies (EPA), and companies (the oil spill company) to have the ability to see permissible data and make decisions without changing their current practice or architecture.

The needs of this SEDC project, as embodied in the invention—data assurance management—provided for a uniform data model for all data regardless of the data source or data collector. This allowed easier retrieval and analysis of information from multiple reporting tools as opposed to multiple variations of proprietary data models.

When importing from several data sources, a single data warehouse, induced into the process after and during the implementation of data assurance management processes and methods provided the ability to verify information across different sources for errors, inconsistencies and duplication. Information was refined and data installed into a single repository, where data could then be verified, normalized and assured of its integrity.

Data warehouses that store multiple sources under one repository are assured of control under a single handler allowing for a more secure infrastructure and since a data warehouse functions separate from operational systems (reporting tools, access applications, etc.), this allows fast retrieval times of data without causing delay.

A single repository of data across multiple sources allowed for unique trend analysis and reporting where data is analyzed from all sources as opposed to trends found in individual systems.

Finally, a central data warehouse ensured properly mandated Information Assurance, assuring the handing of the data with regards to:

Confidentiality—Assurance that information is not disclosed to unauthorized individuals, processes or devices Integrity—Quality with regards to the logical correctness, consistency and reliability of the information as well as assurance against unauthorized modification or destruction Availability—Timely, reliable access to data and information for authorized users as it is needed Authentication—Security measures to verify an individual's authorization to receive specific information Authenticity—The necessity to ensure information is not only genuine but, in the case of duplicates, establishes a means of identifying a master record Non-repudiation—Assurance that a sender of data is provided with proof of delivery and the recipient is provided with proof of the sender's identity, so neither party can deny delivery or receipt of a transaction.

The invention claimed is:

1. A data assurance management method comprising:
selecting a plurality of data elements based on user requirements;
conducting a statistical random sampling of the plurality of data elements;
scoring, by one or more processors, the statistical random sampling to determine absolute and relative value of one or more data metrics, wherein the one or more data metrics are measures of data quality dimensions, wherein the data quality dimensions are characteristics of the plurality of data elements;
determining one or more frontier data points;
selecting an optimal data aggregation based on the one or more frontier data points;
applying the optimal data aggregation to the statistical random sample; and
rank ordering the aggregated data to create an output database from resultant data where at least a portion of less relevant data is eliminated in the output database.

2. The method of claim 1, wherein the plurality of data elements are units of information each having a unique meaning and distinct value.

3. The method of claim 1, wherein the plurality of data elements each comprise a name of the data element, a definition and an enumerated value.

4. The method of claim 1, wherein the statistical random sampling is a portion of an entire population selected to represent the entire population.

5. The method of claim 1, wherein the statistical random sampling is a subpopulation of interest.

6. The method of claim 1, further comprising ordering the statistical random sampling.

7. The method of claim 1, wherein the one or more data metrics are a measure of data quality dimension used in the scoring, wherein the data quality dimension is a characteristic of the statistical random sampling.

8. The method of claim 7, wherein the data quality dimensions are selected from the group consisting of: accuracy, redundancy/uniqueness, velocity, acceleration, completeness, measure, timeliness, coverage, consistency, availability, read time, write time, propagation time, and combinations thereof.

9. The method of claim 8, wherein the selected data quality dimensions are predetermined.

10. The method of claim 9, wherein the scoring further comprises applying a first data quality dimension, applying a first score to each member of the statistical random sampling, applying a subsequent data quality dimension, applying a subsequent score to each member of the statistical random sampling, and repeating until all predetermined data quality dimensions are applied.

11. The method of claim 1, further comprising performing a multivariate optimization.

12. The method of claim 1, wherein the one or more frontier data points are incomparable data elements resulting from combining data sources.

13. The method of claim 1, wherein the optimal data aggregation is predetermined.

14. The method of claim 1, wherein the optimal data aggregation determines relative importance of each data quality dimension.

15. The method of claim 1, wherein the applying the optimal data aggregation comprises determining if the data is entered into an integrated database, and entering the resultant data in the integrated database if the resultant data is unique or if a rules engine selects the resultant data as an optimal data set.

* * * * *